(12) United States Patent
Kuehl et al.

(10) Patent No.: US 8,528,610 B2
(45) Date of Patent: Sep. 10, 2013

(54) MECHANICALLY ENERGIZED SUBSTANCE COMMUNICATION COUPLING SYSTEM

(75) Inventors: Steven J. Kuehl, Stevensville, MI (US); Richard A. McCoy, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 768 days.

(21) Appl. No.: 12/643,240

(22) Filed: Dec. 21, 2009

(65) Prior Publication Data

US 2011/0146330 A1 Jun. 23, 2011

(51) Int. Cl.
*B65B 1/04* (2006.01)

(52) U.S. Cl.
USPC ............................. 141/349; 141/94; 141/351

(58) Field of Classification Search
USPC .................................. 141/94, 349, 351–362
See application file for complete search history.

(56) References Cited

U.S. PATENT DOCUMENTS

| | | | |
|---|---|---|---|
| 1,958,206 A | 5/1934 | Rubsam | |
| 3,101,984 A | 8/1963 | Wieckmann | |
| 3,258,553 A | 6/1966 | Breslin | |
| 3,561,506 A * | 2/1971 | Johnson | 141/360 |
| 3,710,060 A | 1/1973 | Brevick | |
| 4,068,179 A | 1/1978 | Sample et al. | |
| 4,148,536 A | 4/1979 | Petropoulsos et al. | |
| 4,317,969 A | 3/1982 | Riegler et al. | |
| 4,445,743 A | 5/1984 | Bakker | |
| 4,591,732 A | 5/1986 | Neuenschwander | |
| 4,604,505 A | 8/1986 | Henninger | |
| 4,663,542 A | 5/1987 | Buck et al. | |
| 4,844,582 A | 7/1989 | Giannini | |
| 4,964,891 A | 10/1990 | Schaefer | |
| 5,031,258 A | 7/1991 | Shaw | |
| 5,207,148 A | 5/1993 | Anderson et al. | |
| 5,368,275 A | 11/1994 | Ketcham et al. | |
| 5,385,468 A | 1/1995 | Verderber | |
| 5,433,623 A | 7/1995 | Wakata et al. | |
| 5,450,877 A | 9/1995 | Graffin | |
| 5,713,752 A | 2/1998 | Leong et al. | |
| 5,828,341 A | 10/1998 | Delamater | |
| 5,953,129 A | 9/1999 | Anderlik et al. | |
| 6,176,718 B1 | 1/2001 | Skarie et al. | |
| 6,183,264 B1 | 2/2001 | Harsanyi | |
| 6,350,148 B1 | 2/2002 | Bartolutti et al. | |
| 6,359,270 B1 | 3/2002 | Bridson | |
| 6,428,334 B1 | 8/2002 | Skarie et al. | |
| 6,534,951 B2 | 3/2003 | Kawashima | |
| 6,559,882 B1 | 5/2003 | Kerchner | |
| 6,633,157 B1 | 10/2003 | Yamaki et al. | |
| 6,685,491 B2 | 2/2004 | Gergek | |

(Continued)

FOREIGN PATENT DOCUMENTS

EP 0868077 A2 9/1998
JP 60033716 A 2/1985

(Continued)

*Primary Examiner* — Jason K Niesz
(74) *Attorney, Agent, or Firm* — Clifton G. Green; McGarry Bair PC

(57) ABSTRACT

A substance communication coupling system includes a substance connector component for communication of a substance with another substance connector component. A substance switch is provided for selectively permitting communication of the substance between the substance connector components. The substance switch is activated to transfer a substance from a substance source to a substance consumer in response to a proximity sensor engaging a proximity target.

31 Claims, 17 Drawing Sheets

(56) References Cited

U.S. PATENT DOCUMENTS

| | | | |
|---|---|---|---|
| 6,921,113 B1 | 7/2005 | Vlasblom | |
| 6,969,928 B2 | 11/2005 | Hanson | |
| 6,973,936 B2 | 12/2005 | Watson | |
| 6,981,695 B1 | 1/2006 | Hedlund et al. | |
| 6,986,263 B2 | 1/2006 | Crisp, III | |
| 7,024,717 B2 | 4/2006 | Hilscher et al. | |
| 7,201,005 B2 | 4/2007 | Voglewede et al. | |
| 7,207,080 B2 | 4/2007 | Hilscher et al. | |
| 7,209,038 B1 | 4/2007 | Deconinck et al. | |
| 7,264,026 B2 | 9/2007 | Gruber et al. | |
| 7,291,032 B1 | 11/2007 | Carver et al. | |
| 7,354,292 B1 | 4/2008 | Lloyd et al. | |
| 7,404,298 B2 | 7/2008 | Kim et al. | |
| 7,493,926 B2 * | 2/2009 | Weglin | 141/351 |
| 7,584,030 B1 | 9/2009 | Graham | |
| 7,618,295 B2 | 11/2009 | McCoy | |
| 7,625,246 B2 | 12/2009 | McCoy et al. | |
| 7,639,485 B2 | 12/2009 | McCoy | |
| 7,651,368 B2 | 1/2010 | Kendall et al. | |
| 7,686,127 B2 | 3/2010 | LeClear et al. | |
| 7,713,090 B2 | 5/2010 | Kendall et al. | |
| 7,740,505 B2 | 6/2010 | McCoy | |
| 7,740,506 B2 | 6/2010 | McCoy | |
| 7,748,494 B2 | 7/2010 | Leclear et al. | |
| 7,751,184 B2 | 7/2010 | McCoy | |
| 7,765,332 B2 | 7/2010 | McCoy et al. | |
| 7,798,865 B2 | 9/2010 | McCoy et al. | |
| 7,810,343 B2 | 10/2010 | McCoy et al. | |
| 7,814,944 B2 * | 10/2010 | Weglin | 141/351 |
| 7,826,203 B2 | 11/2010 | McCoy | |
| 7,841,907 B2 | 11/2010 | McCoy | |
| 7,843,697 B2 | 11/2010 | McCoy et al. | |
| 7,852,619 B2 | 12/2010 | McCoy | |
| 7,865,639 B2 | 1/2011 | McCoy et al. | |
| 7,869,201 B2 | 1/2011 | McCoy et al. | |
| 7,870,753 B2 | 1/2011 | Marcy et al. | |
| 7,871,300 B2 | 1/2011 | McCoy et al. | |
| 7,898,812 B2 | 3/2011 | McCoy et al. | |
| 7,903,397 B2 | 3/2011 | McCoy | |
| 7,916,336 B2 | 3/2011 | Silverbrook et al. | |
| 7,931,114 B2 | 4/2011 | LeClear et al. | |
| 7,934,958 B2 | 5/2011 | Kendall et al. | |
| 7,980,088 B2 | 7/2011 | LeClear et al. | |
| 8,008,586 B2 | 8/2011 | Kuehl et al. | |
| 8,035,958 B2 | 10/2011 | Kendall et al. | |
| 8,040,666 B2 | 10/2011 | McCoy et al. | |
| 8,151,016 B2 | 4/2012 | McCoy | |
| 2001/0017134 A1 * | 8/2001 | Bahr | 128/204.18 |
| 2002/0022991 A1 | 2/2002 | Sharood et al. | |
| 2003/0037447 A1 | 2/2003 | Gruber et al. | |
| 2003/0154338 A1 | 8/2003 | Boz et al. | |
| 2003/0221616 A1 | 12/2003 | Carpenter et al. | |
| 2004/0036273 A1 | 2/2004 | McClary | |
| 2004/0154318 A1 | 8/2004 | Roh et al. | |
| 2004/0202421 A1 | 10/2004 | Iiduka et al. | |
| 2005/0011205 A1 | 1/2005 | Holmes et al. | |
| 2006/0021659 A1 | 2/2006 | Andersson | |
| 2006/0053655 A1 * | 3/2006 | Weglin | 36/3 B |
| 2006/0118694 A1 | 6/2006 | Lee et al. | |
| 2006/0125360 A1 | 6/2006 | Kim et al. | |
| 2006/0168236 A1 | 7/2006 | Higuma et al. | |
| 2006/0187080 A1 | 8/2006 | Slatter | |
| 2007/0086151 A1 | 4/2007 | Oh et al. | |
| 2008/0065289 A1 | 3/2008 | Bertosa et al. | |
| 2008/0125911 A1 | 5/2008 | Ebrom et al. | |
| 2008/0158172 A1 | 7/2008 | Hotelling et al. | |
| 2008/0164224 A1 | 7/2008 | McCoy et al. | |
| 2008/0164225 A1 | 7/2008 | McCoy | |
| 2008/0164226 A1 | 7/2008 | McCoy et al. | |
| 2008/0164227 A1 | 7/2008 | LeClear et al. | |
| 2008/0164796 A1 | 7/2008 | McCoy et al. | |
| 2008/0165282 A1 | 7/2008 | Marcy et al. | |
| 2008/0165474 A1 | 7/2008 | McCoy et al. | |
| 2008/0165475 A1 | 7/2008 | McCoy et al. | |
| 2008/0165476 A1 | 7/2008 | McCoy et al. | |
| 2008/0165478 A1 | 7/2008 | McCoy | |
| 2008/0165505 A1 | 7/2008 | McCoy et al. | |
| 2008/0165509 A1 | 7/2008 | Kendall et al. | |
| 2008/0165998 A1 | 7/2008 | LeClear et al. | |
| 2008/0166895 A1 | 7/2008 | McCoy et al. | |
| 2008/0166915 A1 | 7/2008 | Kendall et al. | |
| 2008/0168205 A1 | 7/2008 | McCoy et al. | |
| 2008/0192411 A1 | 8/2008 | McCoy | |
| 2008/0201032 A1 | 8/2008 | Fayyad et al. | |
| 2008/0222327 A1 | 9/2008 | McCoy et al. | |
| 2008/0231464 A1 | 9/2008 | Lewis et al. | |
| 2008/0231764 A1 | 9/2008 | Kendall et al. | |
| 2008/0232053 A1 | 9/2008 | Kendall et al. | |
| 2008/0247141 A1 | 10/2008 | Kendall et al. | |
| 2008/0265191 A1 | 10/2008 | Walborn | |
| 2008/0287009 A1 | 11/2008 | McCoy | |
| 2009/0009316 A1 | 1/2009 | Kendall et al. | |
| 2009/0047824 A1 | 2/2009 | Seibert et al. | |
| 2009/0050232 A1 * | 2/2009 | Guan et al. | 141/38 |
| 2009/0054804 A1 | 2/2009 | Gharib et al. | |
| 2009/0161579 A1 | 6/2009 | Saaranen et al. | |
| 2010/0007325 A1 * | 1/2010 | Stark | 324/71.1 |
| 2010/0024573 A1 | 2/2010 | Daverman et al. | |
| 2010/0120284 A1 | 5/2010 | Oka et al. | |
| 2010/0182753 A1 | 7/2010 | Kendall et al. | |
| 2010/0248546 A1 | 9/2010 | McCoy | |
| 2010/0281261 A1 | 11/2010 | Razzell | |
| 2011/0049308 A1 | 3/2011 | Beaman et al. | |
| 2011/0073214 A1 * | 3/2011 | Guan et al. | 141/38 |
| 2011/0146328 A1 | 6/2011 | Hendrickson et al. | |
| 2011/0146329 A1 | 6/2011 | Kuehl et al. | |
| 2011/0146330 A1 | 6/2011 | Kuehl et al. | |
| 2011/0146819 A1 | 6/2011 | Hendrickson et al. | |
| 2011/0147159 A1 | 6/2011 | Kuehl et al. | |
| 2011/0147160 A1 | 6/2011 | Kuehl et al. | |
| 2011/0147161 A1 | 6/2011 | Kuehl et al. | |
| 2011/0147417 A1 | 6/2011 | Kuehl | |
| 2011/0148216 A1 | 6/2011 | McCoy | |
| 2011/0148223 A1 | 6/2011 | McCoy | |
| 2011/0148649 A1 | 6/2011 | de Cavalcanti et al. | |
| 2011/0148650 A1 | 6/2011 | Jenkins et al. | |
| 2011/0148651 A1 | 6/2011 | Hendrickson et al. | |
| 2011/0149485 A1 | 6/2011 | Kuehl et al. | |
| 2011/0152024 A1 | 6/2011 | Kuehl | |
| 2011/0153739 A1 | 6/2011 | McCoy | |
| 2011/0153821 A1 | 6/2011 | McCoy | |
| 2011/0153871 A1 | 6/2011 | Ferragut, II et al. | |
| 2011/0153880 A1 | 6/2011 | McCoy | |

FOREIGN PATENT DOCUMENTS

| | | |
|---|---|---|
| JP | 06310202 A | 11/1994 |
| JP | 06310204 A | 11/1994 |
| JP | 06333633 A | 12/1994 |
| JP | 2007080584 A | 3/2007 |
| WO | 2007/015274 A1 | 2/2007 |

* cited by examiner

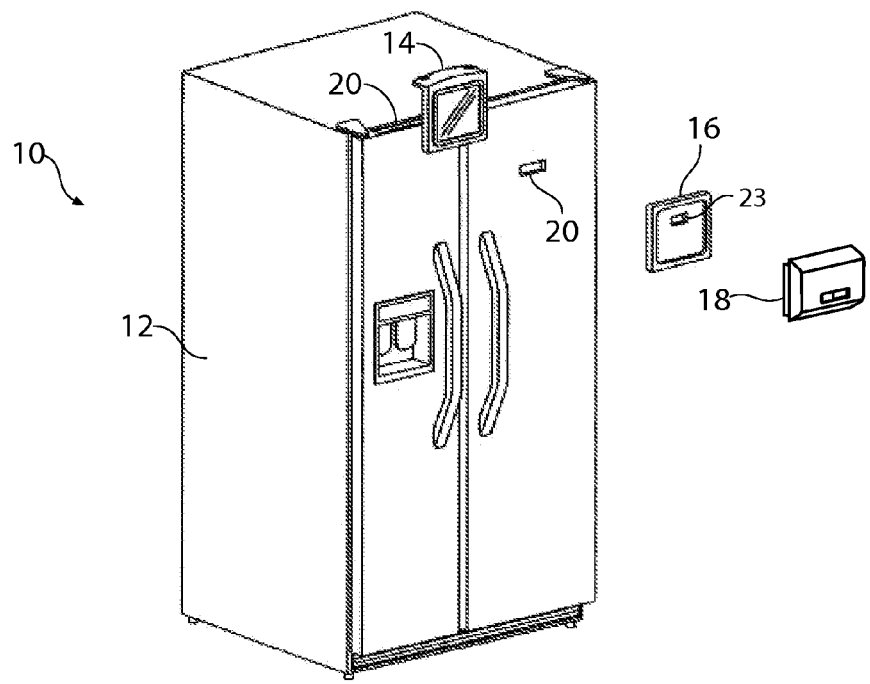
Figure 1
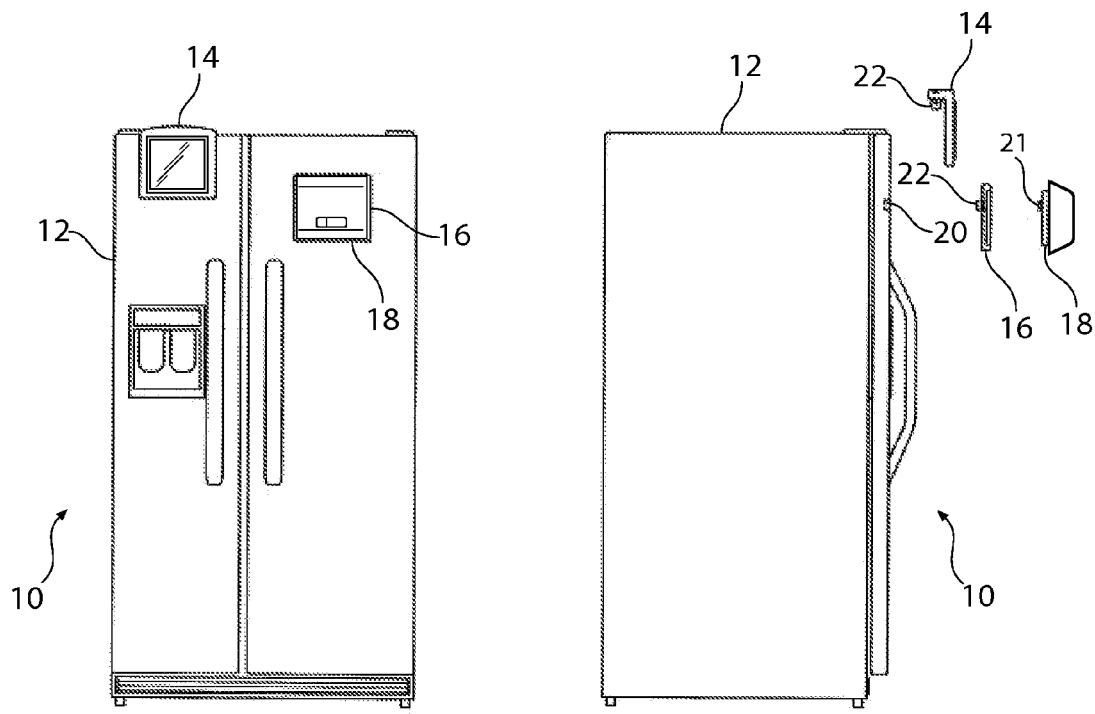
Figure 2
Figure 3

US 8,528,610 B2

MECHANICALLY ENERGIZED SUBSTANCE COMMUNICATION COUPLING SYSTEM

BACKGROUND

Appliances and other useful household equipment are increasingly designed to interact with one another, as well as with a variety of consumer accessory devices. A consumer accessory device may be used, for example, in conjunction with an appliance to enhance or supplement the functionality of the appliance.

BRIEF SUMMARY

The invention relates to interfaces, couplers and coupling systems for connecting substance communicating devices, such as connecting accessory devices to hosts.

According to one aspect of the invention, a system for receiving a substance consumer comprises a substance communication coupling system, which comprises a first substance communicating connector component capable of being operably associated with the substance consumer and including a contact proximity target, a second substance communicating connector component operably engageable with the first substance communicating connector component, the second substance communicating connector component being capable of being operably associated with a substance source, a substance switch operably associated with the second substance communicating connector component, the substance switch selectively permitting the flow of the substance from the substance source to the first substance communicating connector component, and a contact proximity sensor operably associated with the substance switch, the contact proximity sensor engageable with the contact proximity target when the first substance communicating connector component is engaged with the second substance communicating connector component, wherein the substance switch is operable to permit flow of the substance to the first substance communicating connector component in response to the contact proximity sensor engaging the contact proximity target.

According to another aspect of the invention, a substance communication coupling system connects a portable device to a host. The substance communication coupling system comprises a substance connector component capable of communicating a substance, a substance switch operably connected to the substance connector component for selectively permitting the substance to be transmitted to the substance connector component, and a contact proximity sensor operably connected to the substance switch and engageable with a contact proximity target, wherein the substance switch is configured to allow the substance to be transmitted to the substance connector component when the contact proximity sensor engages the contact proximity target.

According to yet another aspect of the invention, a system is used in association with a host having a substance provider, a first substance connector component, and a substance switch selectively providing a substance to the first substance connector component and having a contact proximity sensor, and in association with a substance consumer. The system comprises a second substance connector component engageable with the first substance connector component, a substance line interconnecting the substance consumer and the second substance connector component, and a contact proximity target capable of engaging the contact proximity sensor to activate the substance switch to provide the substance to the first substance connector component.

According to still another aspect of the invention, an adapter removably couples an accessory device having a first device substance connector component to a host having a substance provider, a first host substance connector component that cannot be directly connected to the first device substance connector component, and a substance switch selectively providing a substance to the first host substance connector component in response to a contact proximity sensor engaging a contact proximity target. The adapter comprises a second host substance connector component engageable with the first host substance connector component, a second device substance connector component engageable with the first device substance connector component, a substance line interconnecting the second host substance connector component and the second device substance connector component for the transfer of a substance therealong, and a contact proximity target capable of engaging the contact proximity sensor to actuate the substance switch.

According to still another aspect of the invention, a substance communication device communicates with an appliance having a housing, a cavity in the housing, a cycle of operation capable of performing a useful operation on the article disposed in the cavity, the cavity having an first substance connector component, and a first proximity coupling system component associated with the first substance connector component. The substance communicating device comprises a second substance component capable of connecting with the first substance connector component for the communication of substance therebetween, and a second proximity coupling system component associated with the second substance connector component, the second proximity coupling component being capable of communicating with the first proximity coupling system component within a proximity coupling system to selectively control the communication of substance between the first and second substance communicating connectors in response to the interaction of the first and second proximity system coupling component providing an indication that the first and second substance communicating connectors are coupled.

BRIEF DESCRIPTION OF THE DRAWINGS

In the drawings:

FIG. 1 is a perspective view of a modular system according to a first embodiment of the invention employing a mechanically energized substance communication coupling system for connecting an accessory device to a host.

FIG. 2 is a front elevational view of the modular system of FIG. 1 showing the accessory device attached to the host.

FIG. 3 is a side elevational view of the modular system of FIG. 1 showing the accessory device removed from the host.

DETAILED DESCRIPTION

Figure 4:
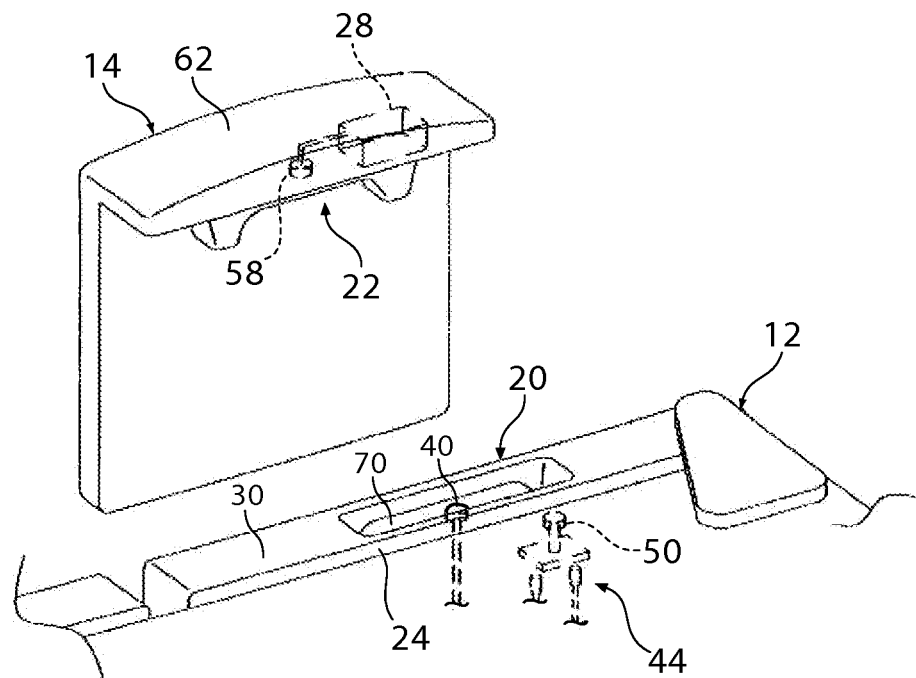
FIG. 4 is partial top rear perspective view of the modular system of FIG. 1 with the accessory device removed from the host, showing a host portion of the substance communication coupling system.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or to otherwise limit or restrict the claims to the precise forms and configurations shown in the drawings and disclosed in the following detailed description.

The drawings and the following detailed description relate generally to systems of substance communication coupling systems for coupling a substance provider with a substance consumer. The following definitions apply to terms that may be used in the specification and the claims, unless otherwise noted.

As used herein, a "substance" is a material that may be communicated from one device to another. A substance may include a gas, a liquid, or a solid, or any combination thereof. Examples of substances include, but are not limited to, liquid soap, powdered soap, compressed air, tablets, caplets, water, ice cubes, and a beverage.

As used herein, "substance communication" or a "substance communication service" is a useful provision of a substance from one device to another device. Communicating a substance includes supplying or receiving a substance. As used herein, communication of substance includes both uni-directional and multi-directional communication between any two devices, either directly or through an adapter, as defined herein. Substance communication may be provided in quanta, such as capsules or other doses of substances, batches of discrete items such as tablets, or consumable components.

The terms "provide" and "supply" and any variation thereof, are used herein to denote a source of the substance relative to a device receiving the substance. Neither term is limited to the original source of the substance. A device that provides or supplies the substance may simply be passing on the substance from the original source. For example, a device that provides water may pass on water it receives from a residential water supply. However, the device may alternatively or additionally provide another substance that originates with the device, such as an additive stored in a reservoir.

The term "receive" and any variation thereof, is used herein to denote receipt of the substance relative to the device providing the substance. The term not limited to the ultimate consumer of the substance. A device that receives a substance may simply be passing on the substance from the source, such as an appliance, to a device that will consume, as hereinafter defined, the substance. The device which receives a substance is not necessarily the end consumer of the substance.

The term "consume" and any variation thereof, as used herein, denotes the act of employing or dispensing at least a portion of the substance received in connection with performing a function.

The term "consumable" and any variation thereof, as used herein, includes any substance that may be consumed by a host, an accessory device, or a user person, such as food, cosmetics, or medicine. The consumable may, for example, be a substance that is used up and must be replenished for subsequent cycles of operation. For a clothes washer, the consumable might be a detergent and/or a softener. For a clothes dryer, the consumable might be an anti-static cloth. For a cooking or refrigeration appliance, the consumable may actually be the article on which the appliance performs its cycle of operation, as in the case of food, later to be consumed by a person. More specific examples of the use of a consumable in appliances include dispensing additives for clothes washers, clothes dryers, or combination washer/dryer appliances. The additives can include, but are not limited to, normal detergents, gentle detergents, dark clothing detergents, cold water detergents, fabric softeners, chlorine bleaches, color-safe bleaches, and fabric enhancement chemistry. Non-limiting examples of fabric enhancers are additives to provide stain resistance, wrinkle resistance, water repellency, insect repellency, color fastness, fragrances, and anti-microbials. Another example of a consumable are the filters used by an appliance. Refrigerators, dryers, washers, and dishwashers are all known to use filters that are consumed in the sense that they wear out and must be replaced.

The term "coupled" and any variation thereof, as used herein, includes any type of connection that permits transfer of a substance between two devices. The term "coupled" does not require a physical connection between the two devices, so long as the coupling permits transfer of a substance. The term "coupled" includes both fixed and removable coupling, as well as both continuous and intermittent coupling.

A "service connector system" is a connector system having at least two separate service connector components, also referred to as service couplers, each associated with a useful device. The service connector components cooperate with one another to couple the useful devices to facilitate communication of a service between the useful devices. A service connector system may carry multiple services. An electromagnetic service connector system, for example, may be associated with or incorporated into a substance connector system or may be independent of a substance connector system but be associated with the same substance holder, substance provider or substance consumer.

The term "useful device" and any variation thereof, as used herein, is a device that is capable of performing a useful physical or virtual function either alone or in combination with another device.

The term "substance consumer" and any variation thereof, as used herein, is any useful device that employs, uses, stores, or dispenses a substance in connection with performing a physical or virtual function. A substance consumer may be, for example, a smart utensil, an appliance, a resource controller, such as a water controller, a dispenser, a filter, a water filter, an air filter, a detergent dispenser, a drink dispenser, a detergent cartridge, and a substance holder, such as a bottle, a jug, or a cycle accessory.

The term "substance provider" and any variation thereof, as used herein, is any device that is capable of providing or supplying a substance to another device.

As used herein, the term "substance holder" is anything that holds or contains a substance, which may include, but is not limited to, a container, a dispenser, a cartridge, a dish, a bag, or a carton.

As used herein, the term "consumable holder" is any substance holder that holds or contains a consumable.

A "substance service communicating device" is any substance holder, substance provider, or substance consumer or any other device which is capable of communicating a substance with another device.

As used herein, the term "host" is an apparatus that has a primary function independent of providing or receiving a substance. A host may be a substance provider, a substance consumer, or both. For example, the host may be an appliance and the primary function can be performing a series of steps to conduct a useful cycle of operation. The appliance may be a conventional household appliance, such as a refrigerator performing a cooling cycle or an ice making cycle. Other examples of appliances that may be hosts include, but are not limited to, a freezer, a conventional oven, a microwave oven, a dishwashing machine, a stove, a range, an air conditioner, a dehumidifier, a clothes washing machine, a clothes dryer, a clothes refreshing machine, and a non-aqueous washing apparatus, or any combination thereof. Alternatively, the host may be a fixture such as a water softener, a water heater, a furnace, pool water treatment equipment, or an HVAC system. The host may be a small device such as a thermostat, a blender, a mixer, a toaster, a coffee maker, a trash compactor, an air purifier, an iron, a vacuum cleaner, or a robot. The host may alternatively comprise a structural feature of a building, such as a wall, a cabinet, or a door. The host may also provide other services, such as electrical power, electronic data, mechanical power, illumination, heat, or sound.

As used herein, the terms "accessory" or an "accessory device" refer to any useful device which may be coupled to a host and communicate a substance to or from the host. An accessory device may be used primarily in conjunction with a host to enhance, supplement, regulate, or monitor the functionality of the host or may have independent functionality and utility. An accessory device may be a substance provider, a substance consumer, or both. An accessory device may be a substance holder or a consumable holder. Examples of an accessory device include, but are not limited to, a paper product dispenser, a dry goods dispenser, a bottle opener, a liquid dispenser, a pill dispenser, a water dispenser, a fan, a motor, a tissue dispenser, a can opener, a mixer, a blender, an ice dispenser, an ice maker, an ice cream maker, a coffee maker, a soap dispenser, and a softener dispenser. An accessory or accessory device may also communicate electromagnetic service with the host.

As used herein, the term "portable device" is an accessory device that is designed to be moveable by a user during its useful life between a use location and a storage location or alternative use location.

As used herein, the term "independent device" is a useful device that provides a useful function without being connected to a substance provider. In some cases the primary function of the independent device is different from the primary function of a host from which the independent device may receive a substance. The independent device may be an accessory device.

As used herein, the term "dependent device" is a useful device that provides a useful function only when connected to a substance provider. A dependent device may be a substance consumer. Examples of a dependent device that may be coupled to a host include, but are not limited to, a smart pan or pot, an ice maker, and a bulk detergent dispenser.

As used herein, the terms "substance communication coupling system" or "substance connector system" refer to any connector system having at least two separate substance connector components, each of which is associated with a useful device. The substance connector components cooperate with one another to couple the useful devices to facilitate communication of a substance between the useful devices.

As used herein, the term "switched substance communication coupling system" is a substance communication coupling system having switching or valving capability in at least one of the substance connector components operable to selectively control the communication of a substance between the components of the substance communication coupling system.

As used herein, the term "substance switch" is any component used to selectively regulate the communication of a substance between components of a substance communication coupling system, such as switches, valves, pumps, fans, and controllers for controlling such devices. A substance switch may be associated with more than one type of service. For example, a substance switch may be associated with, integrated with, or comprise an electromagnetic switch or may be independent of the electromagnetic switch.

As used herein, the term "switching valve" is any valve used to selectively facilitate the communication of a substance between components of a substance communication coupling system.

"Wireless" refers to a type of communication in which power and/or data is transferred over a distance without the use of electrical conductors or wires. For example, electromagnetic waves, light waves, or acoustic waves can be used to carry power and/or data over a distance without using electrical conductors or wires.

A "proximity target" as used herein is any component or device that may be detected when positioned within a predetermined distance of an associated proximity sensor, defined below. A proximity target may be passive, such as a visual target or a magnetic target formed of magnetic or magnetic responsive material. Other examples of passive proximity targets may include a conductive component or surface capable of cooperating with a magnetic field, a current, or a voltage provided by a proximity sensor. A proximity target may alternatively be active or powered such as an electromagnet, a generator of a magnetic field, a current, a voltage or an acoustic wave. An active proximity target may alternatively provide a powered readable display or dispense a detectable chemical.

A "proximity sensor" is any component or device which may detect an associated proximity target when the proximity target is within a range of the proximity sensor. A proximity sensor may detect, for example, a change in an electromagnetic field, an electromagnetic wave, an acoustic wave, a visual target, a chemical component, an electrical signal, a change in voltage, a change in current, a change in frequency, a change in resistance, a change in inductance, a change in capacitance, a mechanical signal, a change in pressure, a displacement, a vibration, and the presence of a chemical. A proximity sensor may be active or passive, such as a magnetic sensor of magnetic or magnet responsive material, or may alternatively be active. Examples of active sensors include active magnetic sensors, light sensors, optical sensors, acoustic sensors, electromagnetic sensors, chemical sensors and thermal sensors. Examples of magnetic sensors include magnets and magnetic responsive components. Examples of optical sensors include infrared sensors, photoelectric sensors, fiber optic sensors, photo resistors, photovoltaic sensors, photo diodes and cameras. Examples of electromagnetic sensors include radio receivers, radar sensors, Hall Effect sensors, inductive sensors, capacitive sensors, variable reluctance sensors and eddy current sensors. Examples of acoustic sensors include ultrasonic sensors and microphones. Examples of chemical sensors include pH change strips in conjunction with optical sensors, reactants that change an electrical circuit resistance or conductivity, reactants that cause increase in hydraulic pressure. Examples of thermal sensors include thermocouples, thermistors, bi-metal thermostats, diaphragm thermostats, color changing surfaces. A contact proximity sensor detects a proximity target by touching the proximity target. A contactless proximity sensor detects the target through a wireless or contactless means. For example, magnetic flux can be used as the signaling mechanism between a contactless proximity sensor and a contactless proximity target.

As used herein, the term "proximity system" is a system that uses a "proximity switch" operated by a plurality of "proximity coupling components," each associated with a different parent device, for determining that the parent devices are in proximity with each other. Parent devices are usually paired, examples of which include a service provide and a service consumer, a host and an accessory device, and a host and an adapter. Proximity coupling components may include a proximity target associated with one parent device to actively or passively provide an indication of the presence of the one parent device and a proximity sensor associated with the other parent device that is responsive to the presence of the proximity target to activate the proximity switch. The proximity switch may be used to provide a signal or message indicative of the proximity of two parent devices or may directly or indirectly regulate the flow of a service along a service line. The systems disclosed herein employ contact proximity systems, wherein the proximity target and proximity switch use physical contact to detect the proximity of the two parent devices As used herein, the term "plug" is a generally male substance connection component.

As used herein, the term "receptacle" is a generally female substance connection component.

As used herein, the terms "substance line" or "substance pathway" refer to a pathway for transferring a substance from one location to another. The substance line may have any of a variety of configurations depending on the type of substance being transferred, including, but not limited to, a pipe, a conduit, a tube, a channel, or fludically-aligned supply and receiver ports with a gap therebetween.

As used herein, the term "adapter" is an intermediate device that may be provided between a first and second useful device, such as between a host and an accessory, to facilitate the communication of substances between the first and second useful devices. An adapter may receive a substance from the first useful device and provide the substance or a modified version of the substance to the second useful device, for example, by providing a substance dispensing through a metering process, by processing the substance, or by combining the substance with an additive. In some applications, multiple adapters may be interposed between two useful devices. In other applications, three or more useful devices may be coupled to a single adapter, such as multiple accessories for a host. In some applications, the adapter may itself be a useful device providing a useful function not provided by the other useful device or devices coupled to it. An adapter may optionally include a transformative component that transforms a service from a service provider to a different service, which is supplied to a service consumer. This may be useful when the service from the service provider is not compatible with the service consumer. The transformative component can be configured to transform the service into a compatible form for the service consumer. Examples of transformative components are protocol converters, power transformers, or other devices that convert substance, energy, or data from a first form to a second form.

As used herein, the term "functional unit" is the combination of any adapter coupled to an accessory, which together provide functionality that neither the adapter nor the accessory can alone provide. Any functional unit itself is also included within the meaning of the term "useful device". In some cases, it is contemplated that a dependent device may be coupled with an adapter that provides one or more services required by the dependent device to enable the functional unit to provide a useful function, in which case the functional unit also constitutes an independent device.

Referring now to FIGS. 1-3, a schematic illustration of a modular system 10 according to a first embodiment of the invention is shown to include at least two substance communicating devices such as at least one host 12 and at least one accessory device 14, shown only schematically, that can be coupled to host 12. Both the host 12 and the accessory device 14 are substance communicating devices, and the host 12 may be a substance provider, and the accessory device 14 may be a substance consumer.

An accessory device 14 may be either directly or indirectly coupled to host 12. Direct coupling occurs when accessory device 14 includes a substance connector component suitably configured for engaging a corresponding substance connector component of host 12 to establish a substance pathway between the host 12 and the accessory device 14. The substance pathway provides a conduit for transferring at least one substance from host 12 to accessory device 14 and from accessory device 14 to host 12.

An adapter 16 may be provided for coupling an accessory device such as an accessory device 18 having an incompatible substance connector component to host 12. A substance connector component is incompatible if it cannot be directly coupled to a corresponding substance connector component, such as when the incompatible substance connector component lacks certain physical features that would enable the substance connector component to engage the corresponding connector to establish a substance pathway. Adapter 16 may include a substance connector component that can be directly coupled with the substance connector component of host 12 and a second substance connector component that can be directly coupled with the incompatible substance connector component of accessory device 18, thereby establishing a substance pathway between host 12 and accessory device 18.

Although accessory device 14 is shown coupled to an upper surface of host 12, whereas accessory device 18 is shown attached to a front surface of host 12 by way of adapter 16, it shall be appreciated that in practice, accessory device 14 may be suitably configured for coupling to host 12 in any desired location and manner in order to accommodate the design and performance requirements of a particular application, such as on any surface on the exterior or interior of an appliance.

Host 12 may perform a primary function. As illustrated herein, host 12 is a refrigerator performing a cooling cycle and/or an ice making cycle. Although the figures show an appliance comprising a refrigerator, it shall be understood that the invention is not limited to refrigerators or appliances in general.

Accessory device 14 and accessory device 18 may also perform at least one primary function. The primary functions of accessory device 14 and accessory device 18 can be different from the primary function performed by host 12, although they need not be.

Host 12 can be configured to communicate at least one substance to or from accessory device 14 and accessory device 18. Similarly, accessory devices 14 and 18 may also be configured to communicate at least one substance to or from host 12. It is not necessary that the substance transferred between host 12 and accessory devices 14 and 18 be used in performing the primary function of host 12 or accessory devices 14 and 18, or otherwise be related to the primary function of either accessory device.

As mentioned previously, in instances where the accessory device includes an incompatible substance connector component that prevents direct coupling of the accessory device to host 12, adapter 16 may be provided for indirectly coupling the accessory device to host 12. Adapter 16 operates to establish a substance pathway for transferring the desired substance between host 12 and accessory device 18 having the incompatible substance connector component.

At least one substance can be supplied to accessory devices 14 and 18 from host 12, or from accessory devices 14 and 18 to host 12. The supply of the substance can be uni-directional in that either host 12 supplies the substance to accessory devices 14 and 18 or accessory devices 14 and 18 supply the substance to host 12. The supply of the substance can also be bi-directional in that the supplied substance can be delivered from host 12 to accessory devices 14 and 18 and from accessory devices 14 and 18 to host 12.

Substances that can be transferred between host 12 and accessory devices 14 and 18 may include any fluid, liquid, gas, powder, and/or solid. Liquid communication may include the transfer of a liquid, such as water, hydraulic fluid, or primary or secondary cooling fluid, among others, between host 12 and accessory devices 14 and 18. Gaseous communication, which may include the transfer of a gas, such as compressed, water vapor, heated air, or cooled air between host 12 and accessory devices 14 and 18, is similar to liquid communication, except the medium by which the service is transferred is a gas rather than a liquid. For example, host 12 may provide a supply of pressurized air or a vacuum condition to accessory devices 14 and 18. Solid communication may include the transfer a solid material, such as a powder, tablets, or pellets, to name a few. Host 12 may be operating as a conduit for transferring a substance received from an outside source, such a community water supply. It shall be appreciated that these are only a few examples of the various types of substances that can be transferred between host 12 and accessory devices 14 and 18.

As illustrated, the accessory device 18 is a medicine module. The module may provide convenient access and consumer visibility to a supply of medicine for a consumer and allow control of temperature and humidity independently of the host 12 by the use of a secondary coolant communicated from the host 12, or alternatively by treated air supplied by the host 12.

It will further be appreciated that, while the embodiments in the drawings illustrate specific types of substance communicating devices, such as a host 12 that may operate and an substance provider, an accessory device 14 that may operate as an substance consumer, and an adapter 16 that may act as a conduit for the transfer of substance from host 12 to accessory device 18, variations from this configuration are possible. These variations include systems with only two substance communicating devices, systems with more than three substance communicating devices, systems where any of the devices may be substance consumers and/or substance providers, systems where multiple substances or other services are communicated, and systems where substances are received by one device, converted in some manner, and then passed to a third device. Furthermore, in the following description, certain components of connector systems and proximity systems are described for the illustrative purposes as being associated with specific substance communicating devices. For example, a proximity switch, target or sensor may be described as being located in a substance provider, substance consumer, host, or portable device. It will be appreciated that these system components may be alternatively assigned to the various substance communicating devices depending on the application.

Host 12 and accessory device 14 may each comprise at least one substance connector component, respectively referred to herein as a host substance connector component 20 and a device substance connector component 22. Host substance connector component 20 and device substance connector component 22 have complementary configurations that enable the substance connector components to be coupled to one another, thereby establishing a substance pathway over which desired substances can be transferred between host 12 and accessory device 14.

Host 12 also has a second substance connector component 20 provided on its front surface for a first device substance connector component 22 provided on the adapter 16. In instances where accessory device 18 includes an incompatible substance connector component 20 and an adapter 16 is used as an intermediate component to connect accessory device 18 to host 12, adapter 16 may include a second device substance connector component 23 for engagement with a device substance connector component 21 of accessory device 18, as well as first device substance connector component 22 for connection with the host substance connector component 20 of host 12. Therefore, device substance connector components 22 may have the same general configuration whether included as part of accessory device 14 or as a part of adapter 16. Similarly, the host communication connector components 20 may have the same general configuration whether included as part of host 12 or as part of adapter 16. Accordingly, for purposes of discussion, the various features and operation of substance connector components 20 and 22 will hereinafter be described in connection with host 12 and accessory device 14, but it shall be appreciated that substance connector components 20 and 22 may also be used in conjunction with adapter 16 or directly with accessory device 18.

Figure 5:
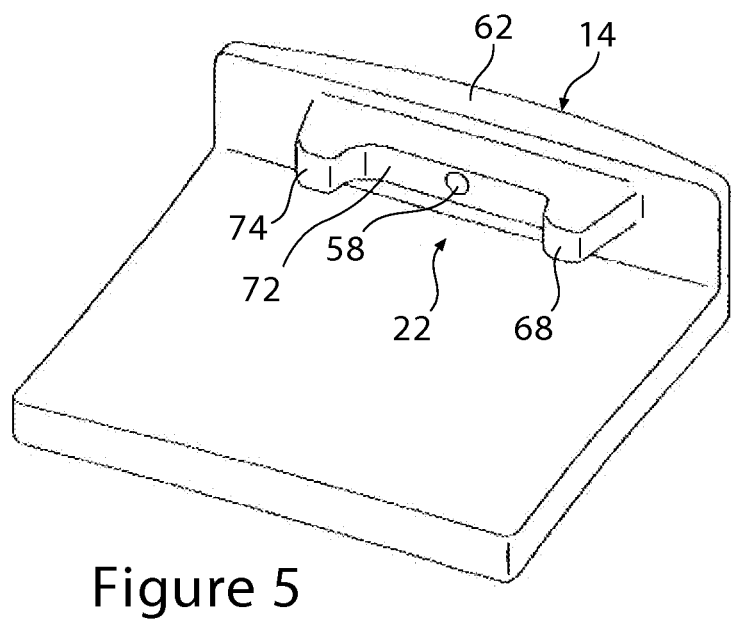
FIG. 5 is bottom perspective view of the accessory device of FIG. 1, showing an accessory device portion of the substance communication coupling system.

Referring to FIGS. 4 and 5, host substance connector component 20 can be integrally formed with host 12 or may be an add-on device. Host substance connector component 20 may be enclosed within a housing 30. Housing 30 may be an integral part of host 12 or may be a separate component. For purposes of discussion, housing 30 is illustrated as an integral part of host 12, and more particularly as part of the door of a refrigerator. When configured as an add-on device, host substance connector component 20 may also function as an adapter to enable a host and an accessory device having dissimilar substance connector components to be indirectly coupled to one another. Host substance connector component 20 may be removable or non-removable from host 12. Host substance connector component 20 can be configured to transfer or receive a single substance or multiple substances.

Device substance connector component 22 can be integrally formed with accessory device 14 or may be an add-on component. For purposes of discussion, device substance connector component 22 is shown integrally formed with accessory device 14. When configured as an add-on component, device substance connector component 22 may also function as an adapter to enable a host and an accessory device having dissimilar substance connector components to be indirectly coupled to one another. Device substance connector component 22 may be removable or non-removable from accessory device 14. Device substance connector component 22 can be configured to transfer or receive a single substance or multiple substances.

Device substance connector component 22 may be enclosed within a housing 62 of accessory device 14. Housing 62 may be an integral part of accessory device 14 or may be a separate component. For purposes of discussion, housing 62 is illustrated as an integral part of accessory device 14.

Figure 6:
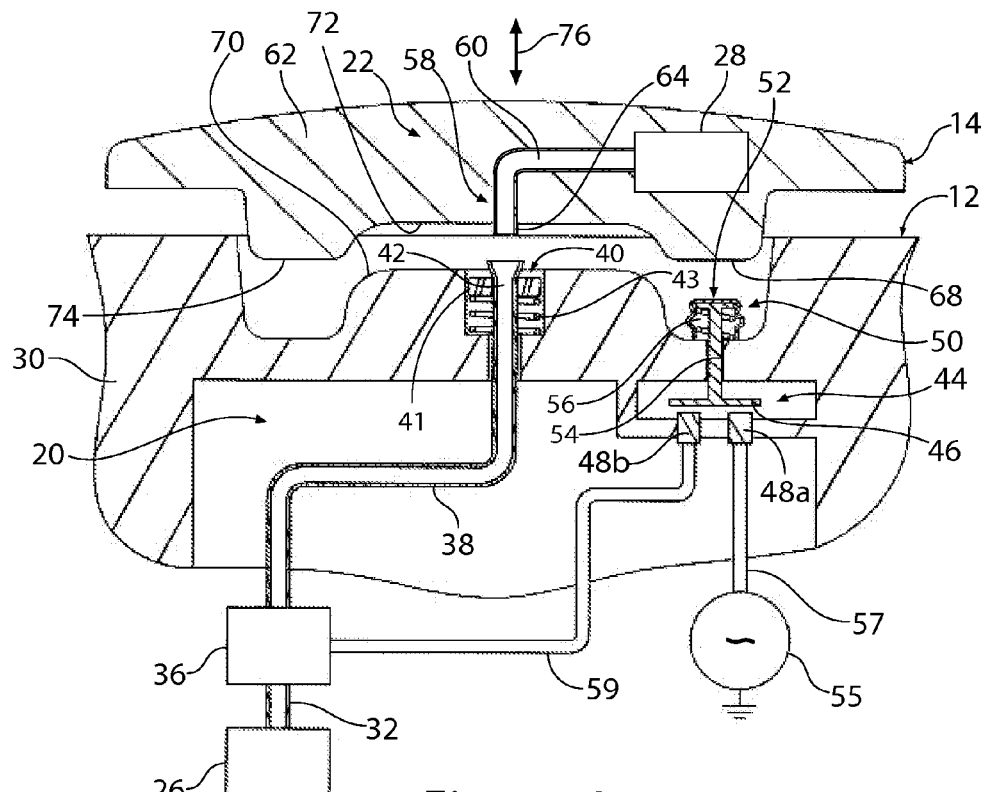
FIG. 6 is a partial cross-sectional view of the modular system of FIG. 1, showing the accessory device portion of the substance communication coupling system positioned for engagement with the host portion of the substance communication coupling system.
Figure 7:
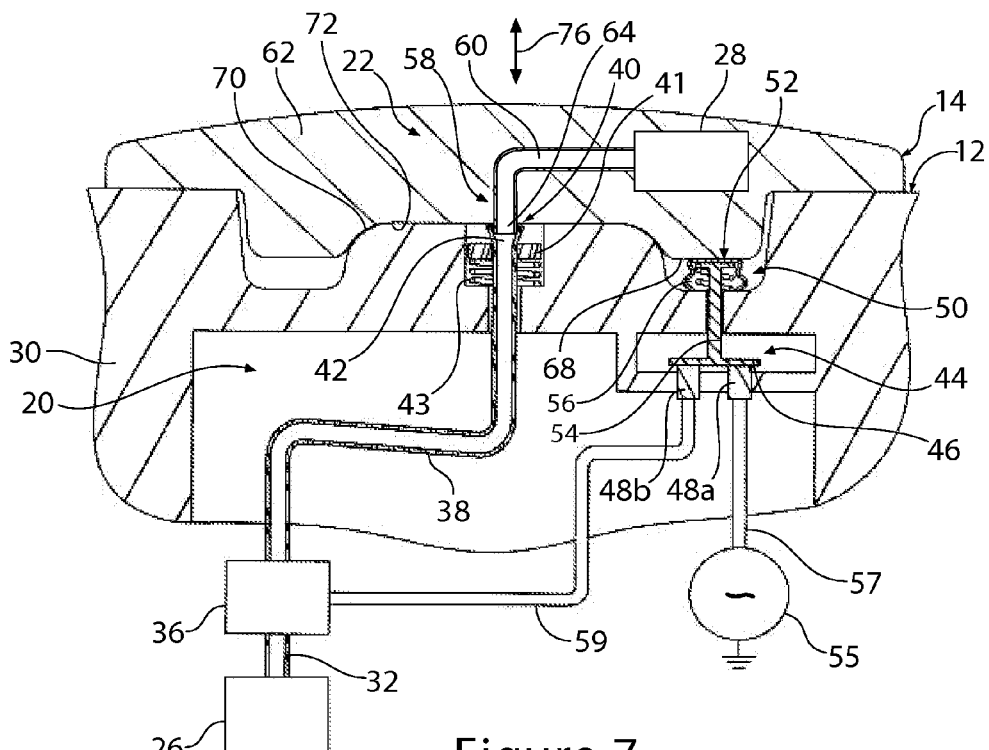
FIG. 7 is a partial cross-sectional view similar to FIG. 6, showing the accessory device portion of the substance communication coupling system engaged with the host portion of the substance communication coupling system.

Referring to FIGS. 6 and 7, host 12 may be associated with a substance provider 26 for selectively providing a substance to host substance connector component 20 for delivery to device substance connector component 22. Accessory device 14 may similarly be provided with a substance consumer 28 capable of using the substance delivered to device substance connector component 22.

Host substance connector component 20 may include a first host substance line 32 operably connected to substance provider 26. First host substance line 32 is operable for transferring a substance from substance provider 26 for delivery to accessory device 14. First host substance line 32 has one end operably connected to the substance provider 26 and an opposite end operably connected to a substance regulating device, such as a substance switch 36.

Host substance connector component 20 may further include a second host substance line 38 having one end operably connected to substance switch 36 and an opposite end operably connected to a host service interface 40. Host service interface 40 extends through housing 30 so as to be accessible from outside the housing 30. An exposed end 42 of host service interface 40 operably engages a corresponding interface of accessory device 14, described below, when accessory device 14 is coupled to host 12. Host 12 may further be provided with a biasing member 43 for outwardly biasing the exposed end 42 of host service interface 40 from housing 30 towards the accessory device 14. Host 12 may further be provided with a seal 41 protecting the host service interface 40 from the substance being communicated.

It should be understood that various substance regulating devices or substance switches may be used to control substance flow through second host substance line 38 to host service interface 40, such as a valve, a pump, or a fan. The type of substance switch may be designed to fail in a non-flowing condition, such as a normally closed valve requiring power to open. As illustrated herein, the substance switch 36 may be a normally closed electro-magnetically operated substance switch.

It will be appreciated that in addition to a line for defining a pathway for substance, host service interface 40 may be configured to provide additional features for communicating other services such as one or more electrical contacts, a fiber optic cable, or a power take off.

For purposes of discussion, first and second host substance lines 32 and 38 are illustrated generically as tube-like structures. The generically illustrated configuration is not intended to depict any particular configuration, but rather schematically represents a variety of potentially different configurations. In practice, the actual configuration will likely vary depending on, at least in part, the type of substance being transferred, packaging requirements, and manufacturing considerations, to name a few. For example, a conveyor or other system may be incorporated for delivering capsulated or powdered substances.

Host substance connector component 20 may include a proximity switch 44 that may be selectively actuated to open substance switch 36 to establish a substance pathway between substance provider 26 and the host service interface 40 when accessory device 14 is coupled to host 12. Switch 44 may include a switch plate 46 that is movable between an open position (see FIG. 6) and closed position (see FIG. 7) against contacts 48a and 48b to enable a substance to be selectively transferred between first host substance line 32 and second host substance line 38 by selectively completing a circuit between contacts 48a and 48b to deliver power to substance switch 36. Substance switch 36 is generally disposed in the open position when accessory device 14 is decoupled from host 12.

The operation of switch 44, and more particularly, switch plate 46, may be controlled by a mechanically-actuated plunger 50. Plunger 50 slidably engages an aperture 54 in housing 30. One end of plunger 50 may be operably connected to switch plate 46 and an opposite end extends out from housing 30 and acts as a proximity sensor 52 that is engageable with a proximity target, described below, associated with accessory device 14. Proximity sensor 52 is adapted to activate switch 44 to selectively permit the flow of a substance from first host substance line 32 to second host substance line 36 upon engaging the proximity target. Depressing plunger 50 causes switch plate 46 to be displaced toward and into engagement with first and second contacts 48a and 48b, thereby allowing a substance to pass from first substance line 32 to second substance line 36. A biasing member 56 may be provided urging plunger 50, and thus the switch plate 46, away from first and second contacts 48a and 48b when the proximity target is not detected by proximity sensor 52.

Proximity switch 44 may have any of a variety of alternative configurations depending on the requirements of the particular application. Proximity switch 44 may be configured to selectively transfer an appropriate control signal for activating substance switch 36 in response to proximity sensor 52 detecting the presence of a proximity target associated with accessory device 14. Proximity switch 44 may be operably connected to a signal source 55, such as a source of electrical power or pressurized fluid, by means of a first control signal line 57. Signal source 55 may be configured to generate an appropriate control signal for activating substance switch 36. The control signal may include, but is not limited to, an electrical signal, an acoustic or electromagnetic wave, a pneumatic signal, an optical signal, a magnetic flux signal, a radio frequency signal, an infrared (IR) signal, a hydraulic signal, or a physical displacement of a linking member. A second control signal line 59 operably connects proximity switch 44 to substance switch 36 for delivery of the control signal.

Substance consumer 28 associated with accessory device 14 may be operably connected to an accessory device service interface 58 by means of an accessory device substance line 60. Similar to host substance lines 32 and 38, accessory device substance line 60 is also illustrated generically as a tube-like structure. The generically illustrated configuration is not intended to depict any particular configuration, but rather schematically represents a variety of potentially different configurations that may vary depending on the type of substance being transferred, as well as other design considerations. In practice, the actual configuration may vary depending on, at least in part, the type of substance being transferred, packaging requirements, and manufacturing considerations, to name a few.

Accessory device service interface 58 extends through housing 62 so as to be accessible from outside the housing 62. An exposed end 64 of accessory device service interface 58 operably engages the exposed end 42 of the host service interface 40 when accessory device 14 is coupled to host 12. It will be appreciated that accessory device service interface 58 may be configured as one or more tubes or another type of interface depending on the type of substance being consumed by substance consumer 28. Accessory device 14 may further be provided with a biasing member, not illustrated, in addition to or instead of biasing member 43 of host 12, for outwardly biasing accessory device service interface 58 from housing 62 towards engagement with the host service interface 40.

Accessory device 14 may further be provided with a proximity target 68 chosen for cooperation with the proximity sensor 52. As illustrated herein, proximity target 68 is a portion of housing 62 configured to contact proximity sensor 52 when accessory device 14 is coupled to host 12.

While proximity switch 44 is illustrated herein as being part of the host 12 and including only the proximity sensor 52, it is understood that the proximity switch 44 could be provided on the accessory device 14, and/or that the proximity sensor 52 and proximity target 68 may together form a proximity switch for determining whether the host 12 and accessory device 14 are in proximity with each other. The proximity switch may be operably connected to the substance switch 36 by a link that transmits movement of the proximity switch to the substance switch 36. As illustrated herein, the link comprises the plunger 50.

Host substance connector component 20 and device substance connector component 22 may include various features to facilitate coupling of accessory device 14 to host 12. For example, host substance connector component 20 may include a raised boss 70 that can engage a corresponding recess 72 of device substance connector component 22. A raised ridge 74 at least partially defines an outer boundary of recess 72. As illustrated herein, a portion of the ridge 74 forms the proximity target 68. Alignment features such as boss 70 and recess 72 may assist in positioning device substance connector component 22 relative to host substance connector component 20 prior to engagement, and may also function to minimizing lateral movement of accessory device 14 relative to host 12 when device substance connector component 22 is coupled to host substance connector component 20. It shall be appreciated, however, that the illustrated configuration is merely one example of the type of features that may be incorporated into host substance connector component 20 and device substance connector component 22 to aide alignment and coupling of accessory device 14 to host 12. In practice, other configurations may also be employed to accommodate various design considerations of a particular application.

The process of coupling and decoupling accessory device 14 with host 12 will now be described. Coupling of accessory device 14 to host 12 can be accomplished by positioning accessory device 14 adjacent host 12 in such a manner that device substance connector component 22 is generally aligned with host substance connector component 20, as shown in FIG. 6. Device substance connector component 22 and host substance connector component 20 can be coupled together by generally moving accessory device 14 toward host 12 along a path indicated by arrow 76 until the two members are fully seated, as shown in FIG. 7. With device substance connector component 22 fully engaging host substance connector component 20, exposed end 64 of accessory device service interface 58 operably engages exposed end 42 of host service interface 40. The process of coupling device substance connector component 22 to host substance connector component 20 causes proximity target 68 to engage proximity sensor 52 of proximity switch 44. Engaging device substance connector component 22 with substance connector component 20 depresses plunger 50 of proximity switch 44 so as to engage switch plate 46 with first and second contacts 48a and 48b. Depressing proximity switch 44 operably couples first control signal line 57 to second control signal line 59, thereby allowing the control signal to be transmitted from signal source 55 to substance switch 36. The control signal activates the substance switch 36 and allows the substance to pass from substance provider 26 to substance consumer 28. Decoupling accessory device 14 from host 12 disengages proximity switch 44 and interrupts the transmission of the control signal to substance switch 36, thereby deactivating the substance switch.

It should be noted that substance switch 36 is intended to selectively permit and inhibit flow of substance from the substance provider 26 to the exposed end 42 of the host service interface 40 based on the presence of the proximity target 68 and that other valves and controls may be provided to further regulate the control of substance based on the needs of the user of the accessory device.

Accessory device 14 may be decoupled from host 12 by reversing the previously described process for coupling the two devices together. Disengaging device substance connector component 22 from host substance connector component 20 releases plunger 50 and disengages switch plate 46 from first and second contacts 48a and 48b, thereby interrupting the flow of substance between accessory device 14 and host 12.

It will be appreciated that coupling components for sealingly coupling device service interface 58 with host service interface 40 will vary depending upon the type of substance being transferred and the pressures involved. Some systems, such as water systems may use compression fitting that may be completely reusable or partially reusable with the replacement of some components.

Figure 8A:
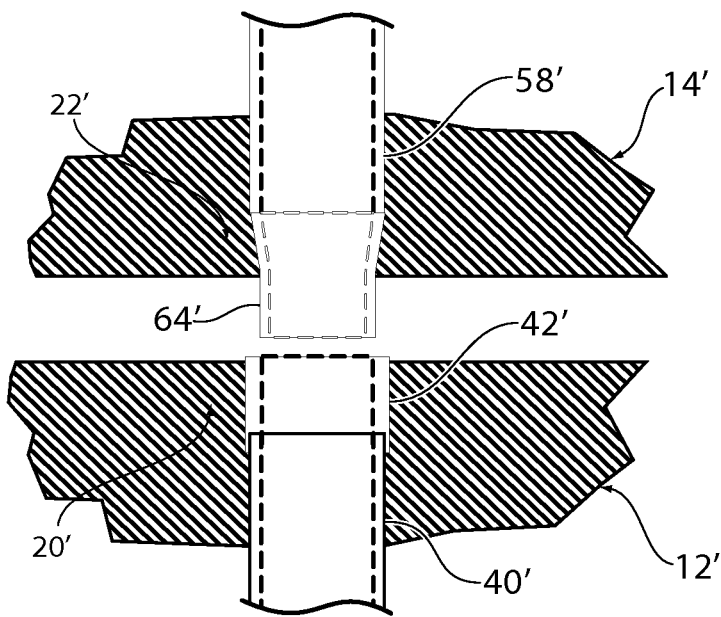
FIG. 8A is an enlarged view of a portion of a modular system according to a second embodiment of the invention having a substance communication coupling system with connector components for sealingly coupling an accessory device to a host.

Referring to FIG. 8A, a modular system according to a second embodiment of the invention is shown and comprises a host 12' having a host substance communication coupling component 20' and an accessory device 14' having a device substance communication coupling component 22', where elements in common with the first embodiment are denoted by the same reference numeral bearing a prime (') symbol. The coupling components 20' and 22' form a substance communication coupling system. The host substance communication coupling component 20' includes a host service interface 40' with an enlarged exposed end 42', and may be in communication with a substance provider (not shown), such as substance provider 26 of FIGS. 6 and 7. The device substance communication coupling component 22' has a device service interface 58' with a tapered exposed end 64' for compression fit into enlarged exposed end 42' for sealingly coupling the coupling components 20' and 22'. Device service interface 58' may be in communication with a substance consumer (not shown), such as substance consumer 28 of FIGS. 6 and 7.

Figure 8B:
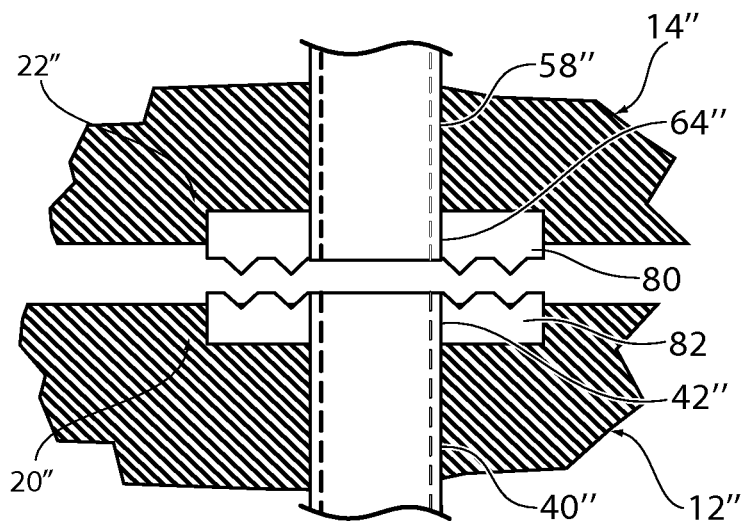
FIG. 8B is an enlarged view of a portion of a modular system according to a third embodiment of the invention having a substance communication coupling system with connector components for sealingly coupling an accessory device to a host.

Referring to FIG. 8B, a modular system according to a third embodiment of the invention is shown and comprises a host 12" having a host substance communication coupling component 20" and an accessory device 14" having a device substance communication coupling component 22", where elements in common with the first embodiment are denoted by the same reference numeral bearing a double prime (") symbol. The host substance communication coupling component 20" includes a host service interface 40" with an exposed end 42" having a gasket 82 thereon, and may be in communication with a substance provider (not shown), such as substance provider 26 of FIGS. 6 and 7. The device substance communication coupling component 22" has a device service interface 58" with an exposed end 64" having a gasket 80 thereon. Device service interface 58" may be in communication with a substance consumer (not shown), such as substance consumer 28 of FIGS. 6 and 7.

The gaskets 80 and 82 may be made of foam for a crush-type fit, which may be useful for substance communication involving gases. The gaskets 80 and 82 may be fit together to seal the substance communication coupling components 20" and 22" when they are coupled together.

In other installations, there may be simple threaded fittings, an example of which will be described shortly. Still other systems, such as sealed systems for refrigeration, may use welds, brazes and chemical bonding which are all meant to be permanent. It will be appreciated that for multiple make-break connections, turning motion on gasket surfaces is avoided and compression is preferred.

Figure 9:
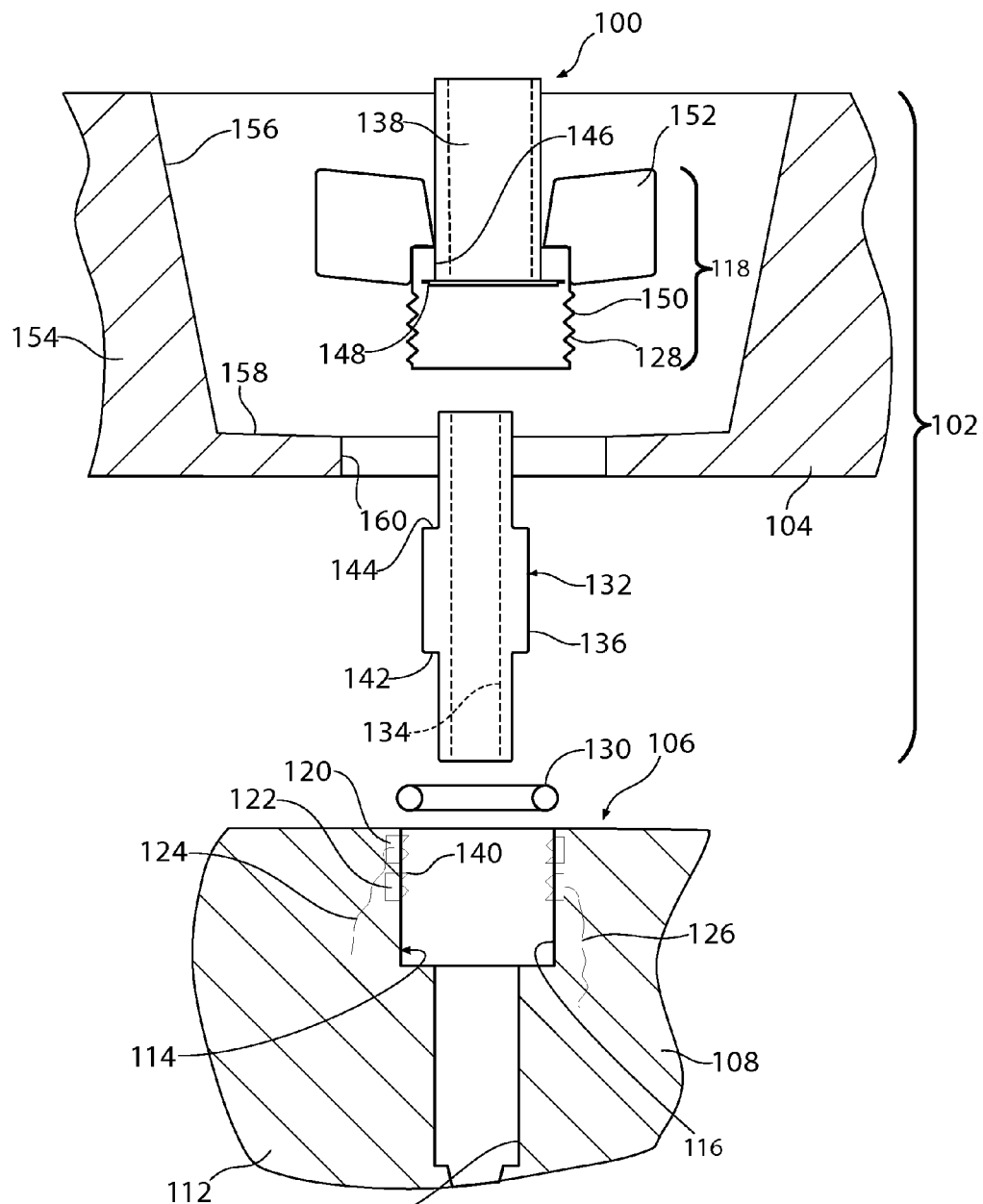
FIG. 9 is an enlarged partial cross-sectional view of a modular system according to a fourth embodiment of the invention having a substance communication coupling system showing a device portion in exploded view with a host portion.

Referring to FIG. 9, a portion of a modular system according to a fourth embodiment of the invention is illustrated, and comprises a substance communication coupling system 100 using a threaded fitting. Substance communication coupling system 100 includes a device substance connector component 102 associated with a device 104 comprising an accessory device, an adapter, or both, and a host substance connector component 106 associated with a host 108.

The host substance connector component 106 may include a substance line 110 formed in a housing 112 of the host 108 leading to a substance switch, not shown, to selectively supply substance from a substance supply, not shown. The substance line 110 terminates in host service interface 114 including an enlarged bore 116 for accepting a device service interface 118, described below, of the device substance connector component 102. The host service interface 114 further includes a threaded surface 140 and a proximity sensor disposed within the enlarged bore 116 adjacent the threaded surface 140. The proximity sensor may be a plurality of electrical contacts 120 and 122 disposed around the perimeter of the enlarged bore 116. The threaded receptacle (i.e. the bore 116 with threaded surface 140) may be provided within the host 108 by making the housing 112 of a dielectric material and inserting conductive nuts to provide the electrical contacts. Alternatively, the electrical contacts may be molded in strips that can be tapped to the threads. The proximity sensor is connected by control signal lines, such as power lines 124 and 126, to selectively provide a control signal to activate the substance switch to permit the supply of substance to the host service interface 114.

The device substance connector component 102 includes host service interface 118 comprising a cap 150 having a threaded outer surface 128 engageable with the threaded surface 140 of the host service interface 114 and an engagement feature such as wings 152 for facilitating user driven rotation of the cap 150. A portion of the threaded outer surface 128 may be formed of an electrically conductive material. This may be accomplished using the conductivity of a metallic cap, such as by using a brass cap over molded in a dielectric plastic, or by affixing a conductive tape to the threaded outer surface 128.

The device substance connector component 102 further includes a flexible seal ring 130 and a fluidic coupler 132. The fluidic coupler 132 may be an elongated pipe segment having a fluid passage 134 therethrough and an enlarged central outer wall portion 136 defining opposing annular surfaces 142 and 144 for abutting, respectively, seal ring 130 and cap 150. The device substance connector component 102 further comprises a supply line 138 extending from the host service interface 118 to a substance consumer, not shown, within the device 104 for delivery of substance from the device service interface 118 to the substance consumer. Supply line 138 extends through an aperture 146 in cap 150 and terminates with a sealing ferrule 148 trapping cap 150 on supply line 138.

The housing 154 of device 104 may be provided with a recess 156 for at partially containing the device service interface 118 when in use. A surface 158 of recess 156 is provided with an aperture 160 for passage therethrough of the cap 150.

The process of coupling and decoupling device 104 with host 108 will now be described. Coupling of device 104 to host 108 can be accomplished by first passing the fluidic coupler 132 through the seal ring 130 and into the substance line 110 until the seal ring 130 is trapped between bore 116 and annular surface 142. Next, the device 104 is disposed adjacent host 108 with the fluidic coupler 132 passing through the aperture 160 in recess 156.

Next, cap 150 is passed over the top of fluidic coupler 132, through aperture 160 and into enlarged bore 116 in housing 112 of host 108, and then rotated using the wings 152 to drive the threaded outer surface 128 into engagement with the threaded surface 140 of the enlarged bore 116, causing the engagement of the device service interface 118 and the host service interface 114. As threaded outer surface 128 of cap 150 advances along threaded surface 140 of enlarged bore 116, sealing ferrule 148 engages annular surface 144 of the fluidic coupler 132 and drives fluidic coupler 132 further into substance line 110, compressing seal ring 130 and sealing ferrule 148, and forming a sealed engagement between the device substance connector component 102 and the host substance connector component 106.

As threaded outer surface 128 of cap 150 advances further along threaded surface 140 of enlarged bore 116, the electrically conductive portion of threaded outer surface 128 encounters electrical contacts 120 and 122 and connects power lines 124 and 126, permitting the flow of a control signal to the substance switch, not shown, to permit the flow of substance from the substance supply, not shown, through the substance communication coupling system 100, to the substance consumer, not shown.

The wings 152 may engage surface 158 of recess 156 to mechanically secure housing 154 to housing 112. Alternatively, other mechanical fastening features or components, not shown, may be used to mechanically lock the housings together either before or after the cap 150 is tightened.

Device 104 may be decoupled from host 108 by reversing the previously described process for coupling the two together. Disengaging device substance connector component 102 from host substance connector component 106 disconnects electrical contacts 120 and 122, thereby disrupting the control signal permitting the flow of substance between device 104 and host 108.

It will be appreciated that, alternatively, host service interface 114 may act as a mechanical proximity target and the proximity sensor for the host substance connector component 106 may comprise an actuator mechanically engaged by the cap 150 or the threaded outer surface 128 of the device service interface 118 as it threaded into the host service interface 114.

Figure 11:
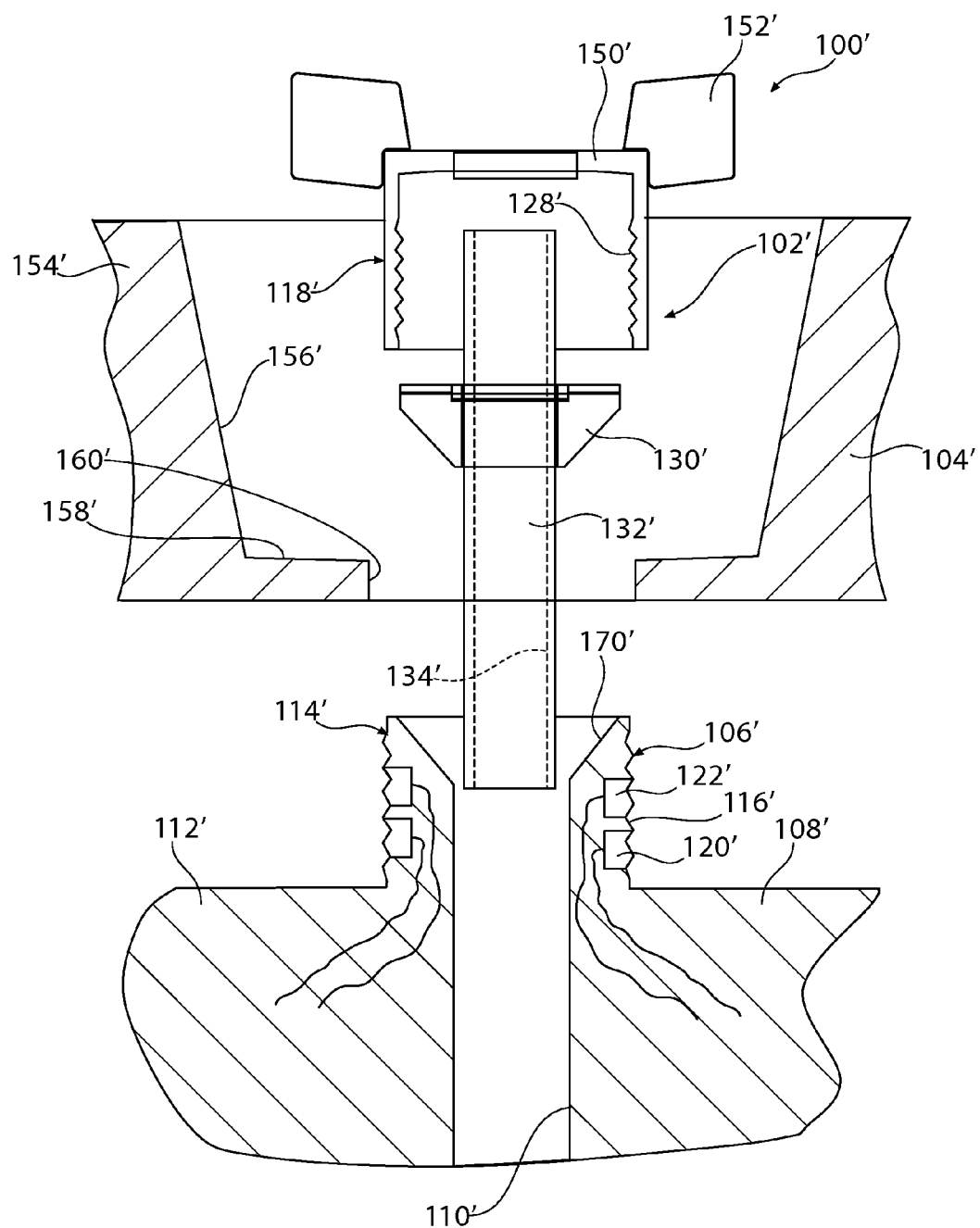
FIG. 11 is an enlarged partial cross-sectional view of a modular system according to a fifth embodiment of the invention having a substance communication coupling system with connector components for sealingly coupling an accessory device to a host.

Referring to FIG. 11, a portion of a modular system according to a fifth embodiment of the invention is illustrated, and comprises a substance communication coupling system 100' using a threaded fitting, where elements in common with the fourth embodiment are denoted by the same reference numeral bearing a prime (') symbol. Substance communication coupling system 100' includes a device substance connector component 102' associated with a device 104' comprising an accessory device, an adapter or both, and a host substance connector component 106' associated with a host 108'.

Figure 10:
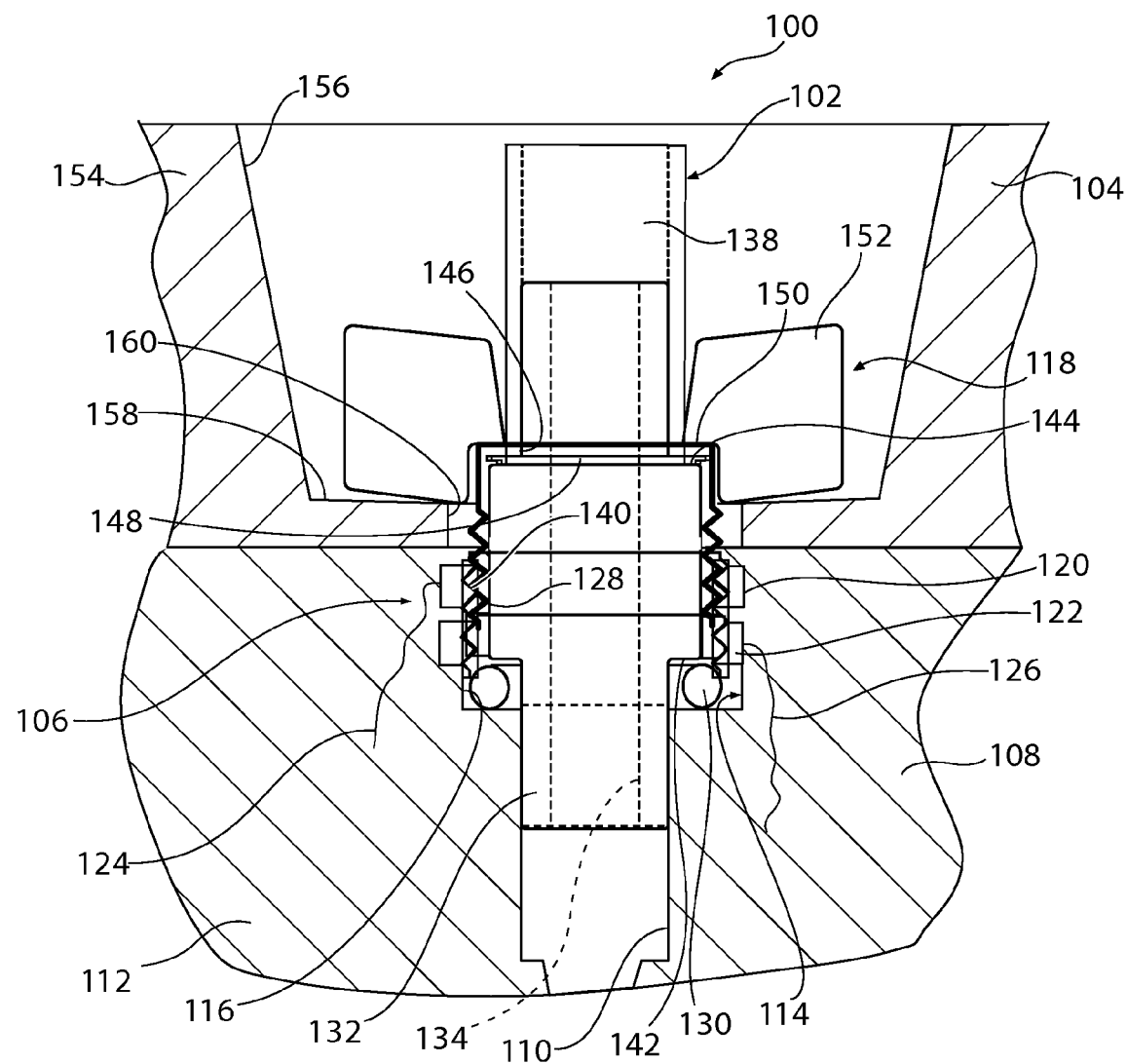
FIG. 10 is a partial cross-sectional view similar to FIG. 9, showing the device portion engaged with the host portion.

The host substance connector component 106' may include a substance line 110' formed in a housing 112' of host 108' leading to a substance switch, not shown, to selectively supply substance from a substance supply, not shown. The substance line 110' terminates in host service interface 114' including a threaded boss 116' for accepting a device service interface 118', described below, of the device substance connector component 102'. The host service interface 114' further includes a proximity sensor, such as electrical contacts 120' and 122' disposed on the outer threads of the threaded boss 116', functioning in the same manner as the proximity sensor described above for FIGS. 9 and 10. Substance line 110' terminates in a chamfered exposed end 170'.

The device substance connector component 102' includes host service interface 118' comprising a cap 150' having a threaded inner surface 128' engageable with the threaded boss 116' of host service interface 114' and an engagement feature such as wings 152' for facilitating rotation of the cap 150'. A portion of the threaded inner surface 128' may be formed of an electrically conductive material. The device substance connector component 102' further includes a fluidic coupler 132' which may be coupled to a substance line, not shown, leading to a substance consumer, not shown, in the device 104' in a manner similar to that described for FIGS. 9 and 10 above. The fluidic coupler 132' may be an elongated pipe segment having a fluid passage 134' therethrough and Swage-Lok™ type seal or a similar compliant seal ring 130'.

Housing 154' of device 104' may be provided with a recess 156' for at least partially containing the device service interface 118' when the device 104' is coupled to the host 108'. A surface 158' of recess 156' is provided with an aperture 160' for passage therethrough of the threaded boss 116'.

Coupling of device 104' to host 108' can be accomplished by first passing the fluidic coupler 132' into substance line 110' until the compliant seal ring 130' abuts chamfered exposed end 170' of substance line 110'. Next, threaded boss 116' is passed through aperture 160' in the housing 154' of device 104' and cap 150' is rotated using the wings 152' to drive the cap 150' into engagement with the threaded boss 116', thereby driving the compliant seal ring 130' into sealing engagement with chamfered exposed end 170' of substance line 110' and actuating the proximity switch to permit flow of substance.

It will be appreciated that, alternatively, host service interface 114' may act a mechanical proximity target and the proximity sensor for the host substance connector component 106' may comprise an actuator mechanically engaged by the cap 150' or the threaded inner surface 128' of the device service interface 118' as it threaded into host device service interface 114'.

Figure 12:
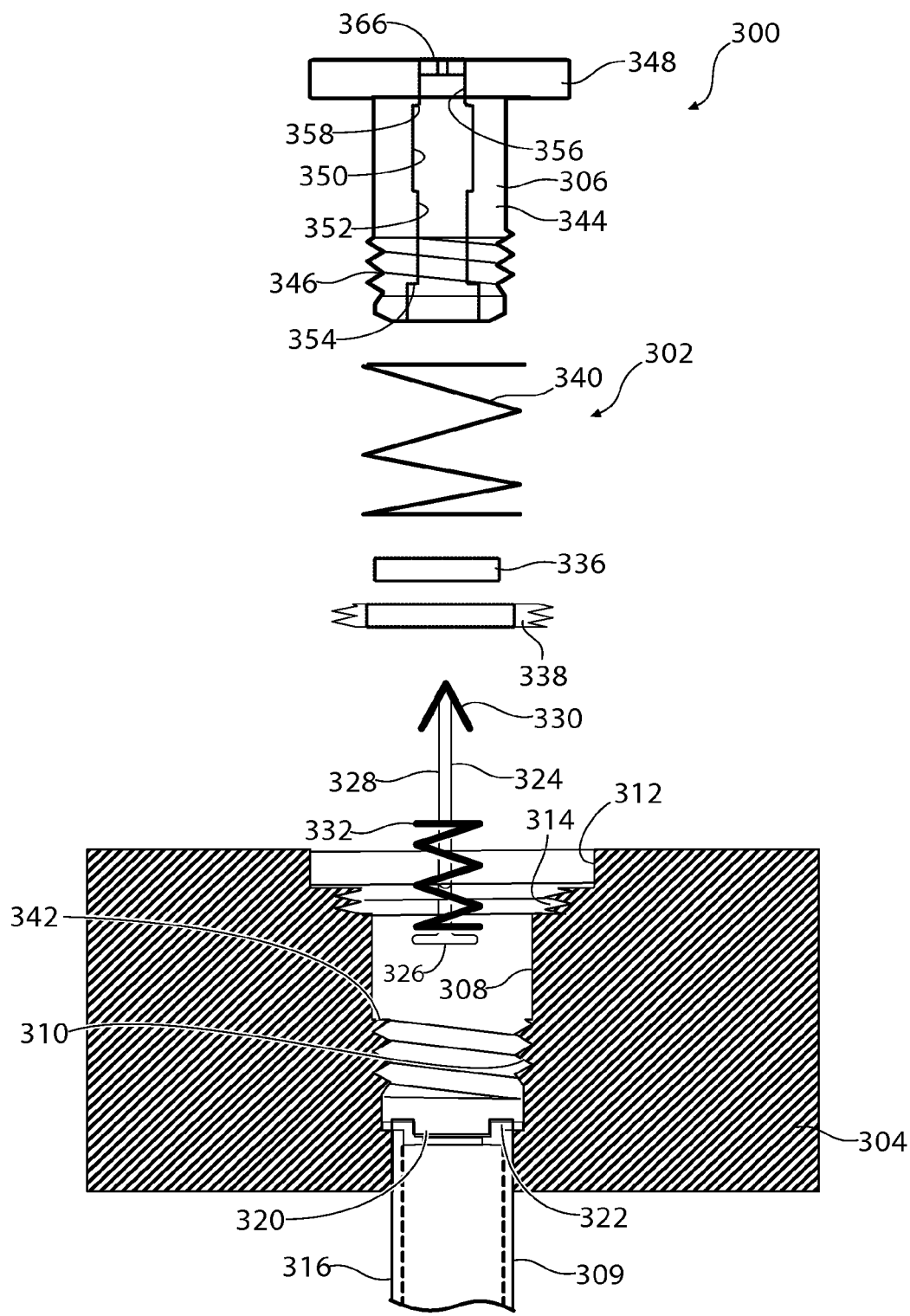
FIG. 12 is an exploded and partially sectional view of a host portion of a substance communication coupling system according to a sixth embodiment of the invention.

Referring to FIG. 12, a substance communication coupling system 300 according to a sixth embodiment of the invention is partially illustrated. The substance connector component 300 includes a host substance connector component 302 associated with a host 304, such as a refrigerator door, may include a threaded spigot 306 for selectively creating a pathway for delivering substance in the manner described below.

Host 304 is provided with a bore 308 connecting at one end to a substance line 309 leading to a substance source, not shown, and is open at an opposite end for admission of the threaded spigot 306, as described below. Bore 308 includes a first threaded portion 310 proximate the line 309 and having an annular shoulder 342, an enlarged counter bore 312 having a larger inner diameter than the first threaded portion 310 at its open end, and a second threaded portion 314 of intermediate diameter located between the first threaded portion 310 and the counter bore 312. Line 309 may include a tube 316, a baffle plate 320 and a baffle plate support 322.

Host substance connector component 302 includes a plunger 324 having a base 326 capable of resting on baffle plate 320, a pin 328 extending upwardly from base 326 and a Christmas tree style retainer 330 on the end of pin 328. A coil spring 332 is disposed around pin 328 and rests against base 326.

Host substance connector component 302 further includes an elastomeric bushing 336 and a bushing retainer nut 338. A coil spring 340 is inserted over a shank 344 of threaded spigot 306. Bushing 336 may then be secured to host 304 by fastening retainer nut 338 to second threaded portion 314 of bore 308.

Figure 13:
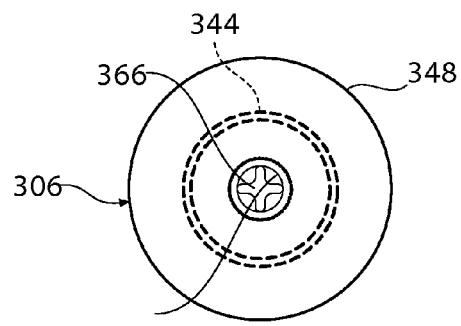
FIG. 13 is a top view of a spigot cap of the host portion of the substance communication coupling system of FIG. 12.

Referring to FIGS. 12 and 13, threaded spigot 306 has a shank 344 having threads 346 at one end, an enlarged head 348 at an opposite end, and a longitudinal passageway 350 extending between the ends for passage therethrough of a substance. Passageway 350 includes a tapered portion 356 near the enlarged head 348 defining a chamfered surface 358 for engagement with retainer 330 when host substance connector component 302 is assembled. Passageway 350 further includes a tapered portion 352 near the shank 344 defining an annular should 354. Enlarged head 348 is provided with a tool engagement feature 366 such as crossed webs of material extending across the opening to passageway 350, to facilitate user rotation of threaded spigot 306.

Figure 14A:
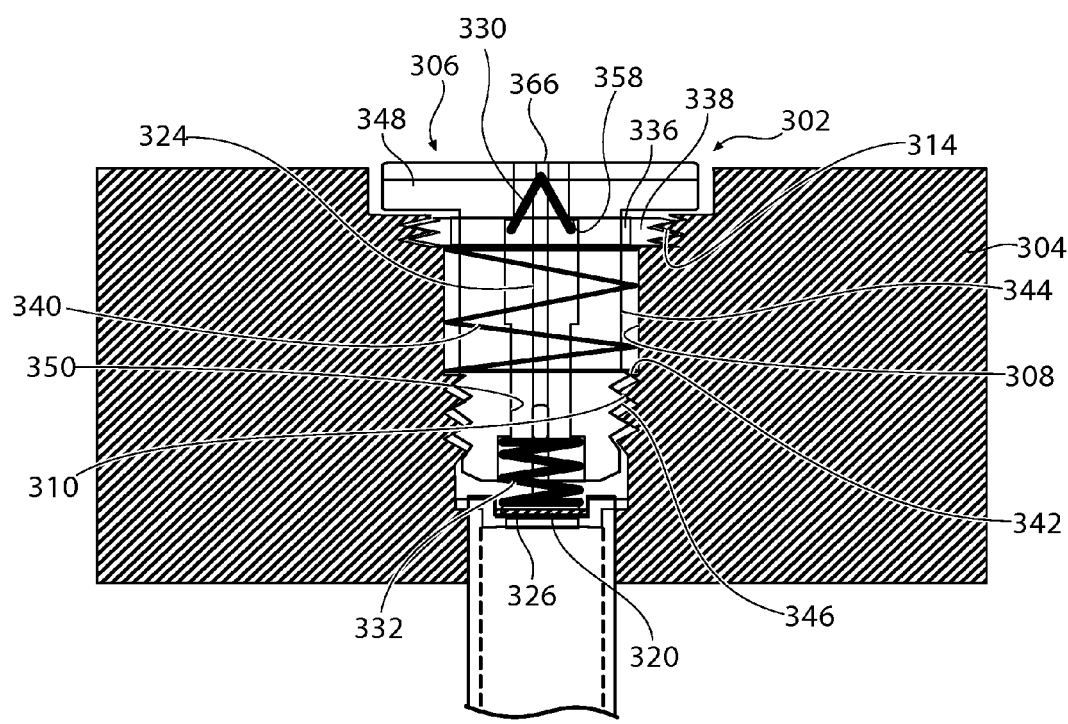
FIGS. 14A, 14B, and 14C are partial cross-sectional views of the host portion of a substance communication coupling system of FIG. 12, shown respectively in a fully retracted, a partially extended, and a fully extended orientation.

Referring to FIGS. 12 and 14A, assembling host substance connector component 302 can be accomplished by first inserting plunger 324 into bore 308 and resting base 326 on baffle plate 320. Coil spring 332 is placed over plunger 324 and rests against base 326. Bushing 336 and bushing retainer nut 338 are placed over shank 344 of threaded spigot 306 followed by coil spring 340. This assembly is then installed in the bore 308 by threading bushing retainer nut 338 into second threaded portion 314 of bore 308, trapping coil spring 340 against abutting annular shoulder 342 and bushing retainer nut 338. Threaded spigot 306 is inserted into bore 308 with plunger 324 inserted into passageway 350. Shank 344 of spigot 306 passes through bushing 338, and threads 346 engage first threaded portion 310 of bore 308.

Spigot 306 is manually threaded into bore 308 by engagement of a suitable tool, not shown, with tool engagement feature 366. As spigot 306 is threaded into bore 308, coil spring 332 engages abutting annular shoulder 354 to compress coil spring 332 and retainer 330 is engaged by chamfered surface 358 to push plunger 324 downwardly so as to push base 326 into sealing engagement with baffle 320. Thus, when spigot 306 is in its fully seated position, as shown in FIG. 14A, plunger 324 forms a seal between substance line 309 of host 304 and passageway 350 in spigot 306, inhibiting the dispensing of substance through spigot 306.

Figure 14B:
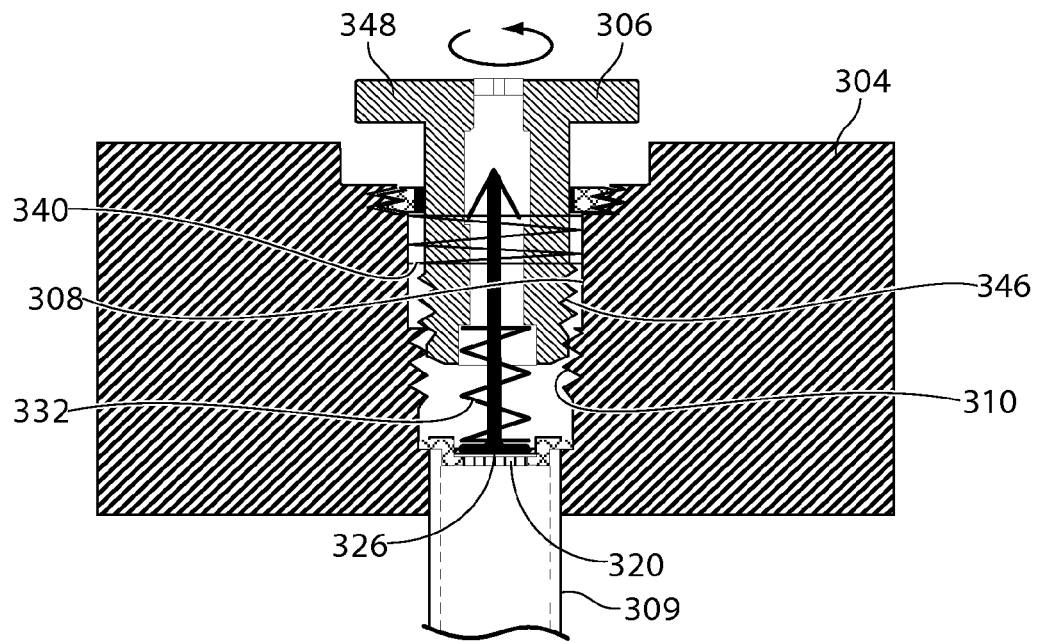

For dispensing, spigot 306 may be rotated as shown in FIG. 14B, so as to back out of full engagement in bore 308. As spigot 306 is retracted a small distance from bore 308, base 326 is maintained in engagement with baffle plate 320 by coil spring 332, thereby maintaining a seal against any pressure exerted by substance in substance line 309. After threads 346 of spigot 306 clear the first threaded portion 310 of bore 308, coil spring 340 biases spigot 306 against retracting any further from bore 308.

Figure 14C:
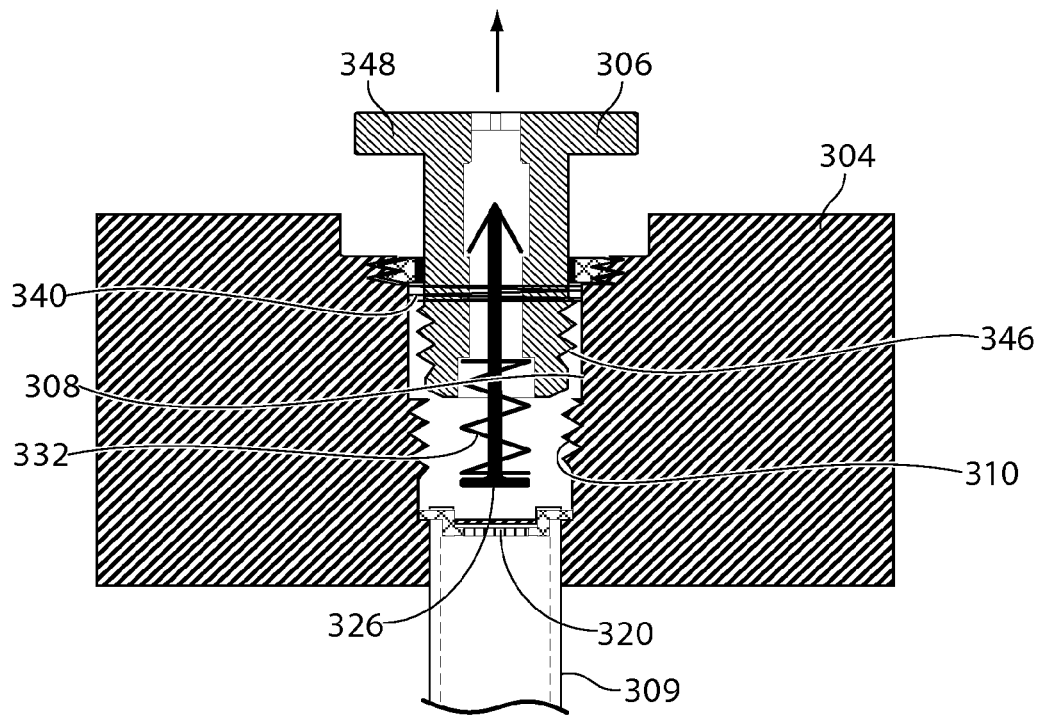

Spigot 306 may be retracted further from bore 308, as shown in FIG. 14C, by pulling the enlarged head 348 against the force of coil spring 340 to a point where coil spring 332 no longer biases base 326 into sealing engagement with baffle plate 320. Thus, spigot 306 will be enabled to permit dispensing of substance from line 309 only after spigot 306 has been disengaged from threaded portion 310 of bore 308 and then further retracted by a pulling action.

Figures 15, 16:
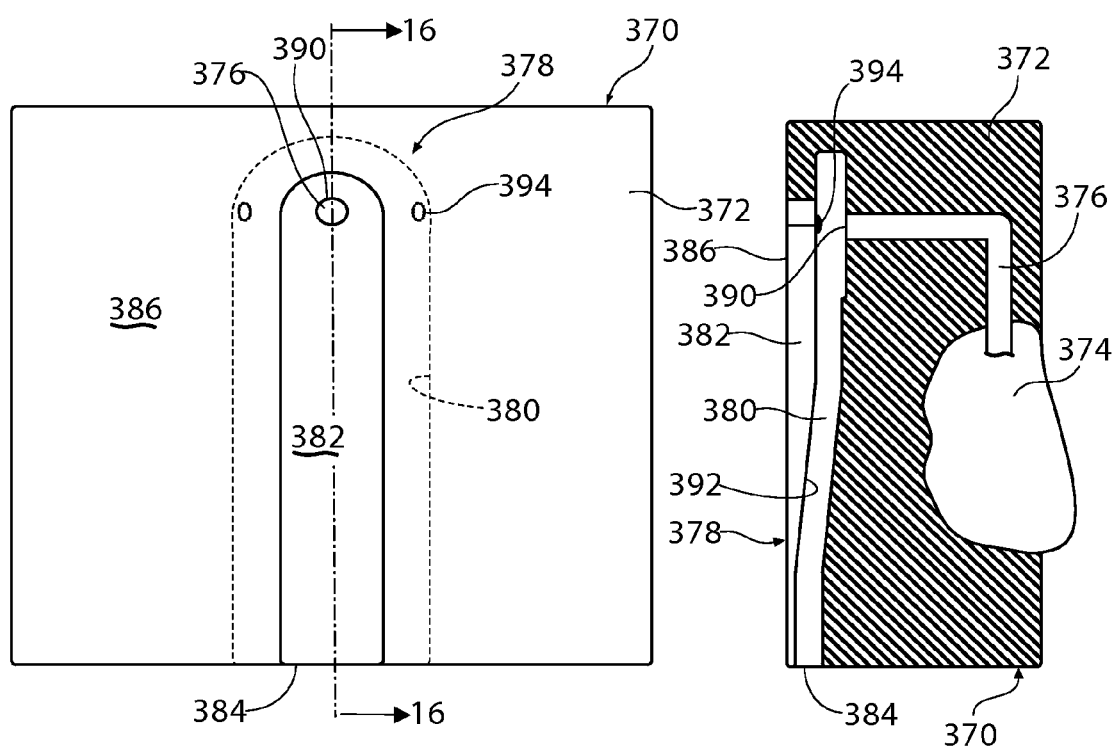
FIG. 15 is a rear elevational view of an accessory device for use with the host portion of a substance communication coupling system of FIG. 12.
FIG. 16 is a sectional view taken along line 16-16 of FIG. 15 illustrating substance pathways in the accessory device.

FIGS. 15 and 16 schematically illustrate rear elevational and sectional views of an accessory device 370 for use with host substance connector component 302. Accessory device 370 includes a housing 372, a substance consumer 374, a substance line 376 leading to substance consumer 374, and a device substance connector component 378 engageable with host substance connector component 302 to deliver substance from host 304 (see FIG. 12) to substance line 376. Device substance connector component 378 includes a channel 380 and a slot 382 opening into channel 380. Channel 380 and slot 382 have a T-shaped channel opening 384 which presents a T-shaped cross section when viewed from a bottom side of the accessory device 370 and extends along a backside 386 of housing 372 to a transverse substance line opening 390 into substance line 376. Channel 380 has an intermediate sloping portion 392 between channel opening 384 and substance line opening 390 which slopes away from backside 386. Housing 372 may be further provided with electrical or mechanical proximity targets 394.

Figure 17:
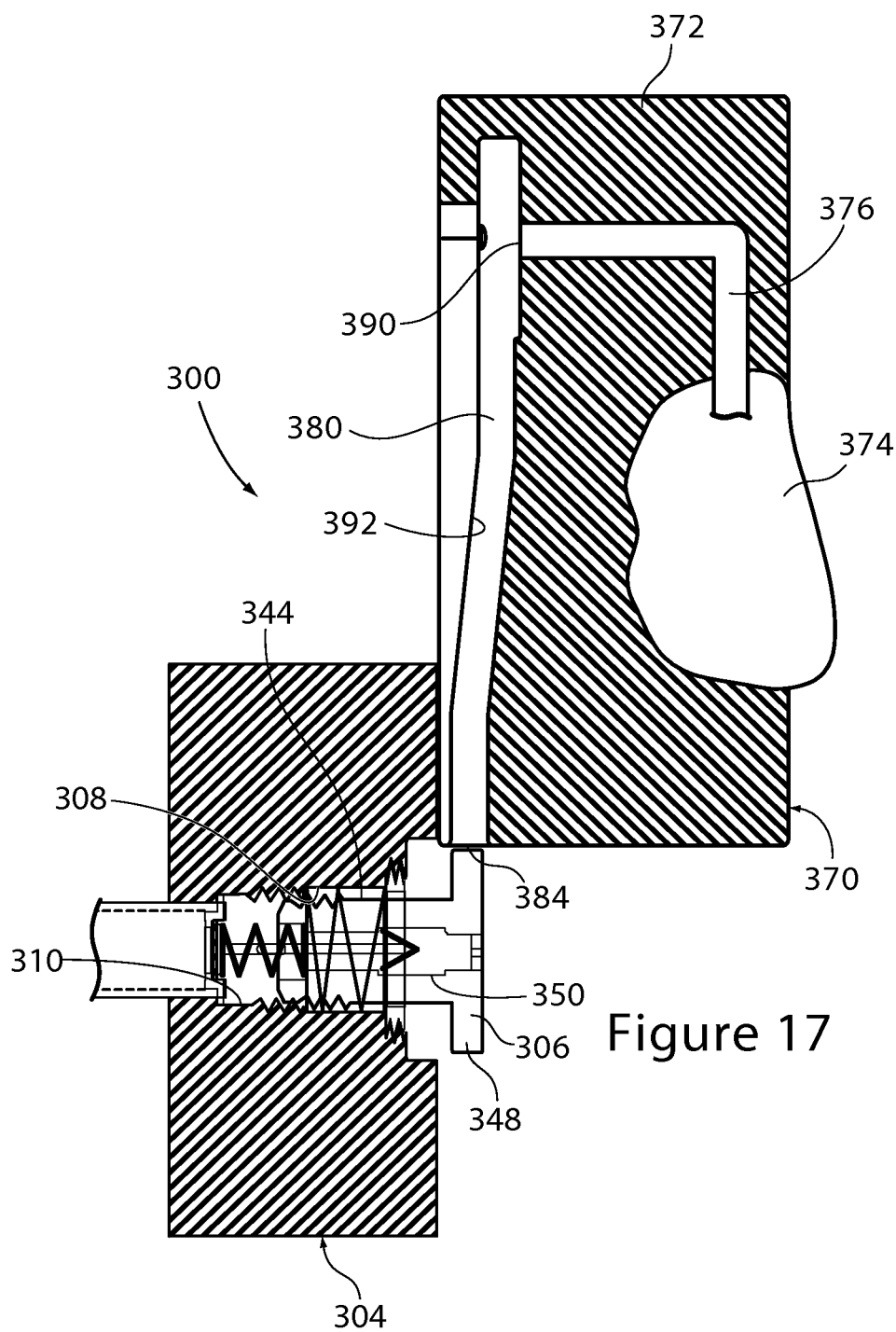
FIG. 17 is a partial cross-sectional view of the mechanically energized substance communication coupling system, showing the accessory device of FIGS. 15 and 16 positioned for engagement with the host portion of a substance communication coupling system of FIGS. 12-14.
Figure 18:
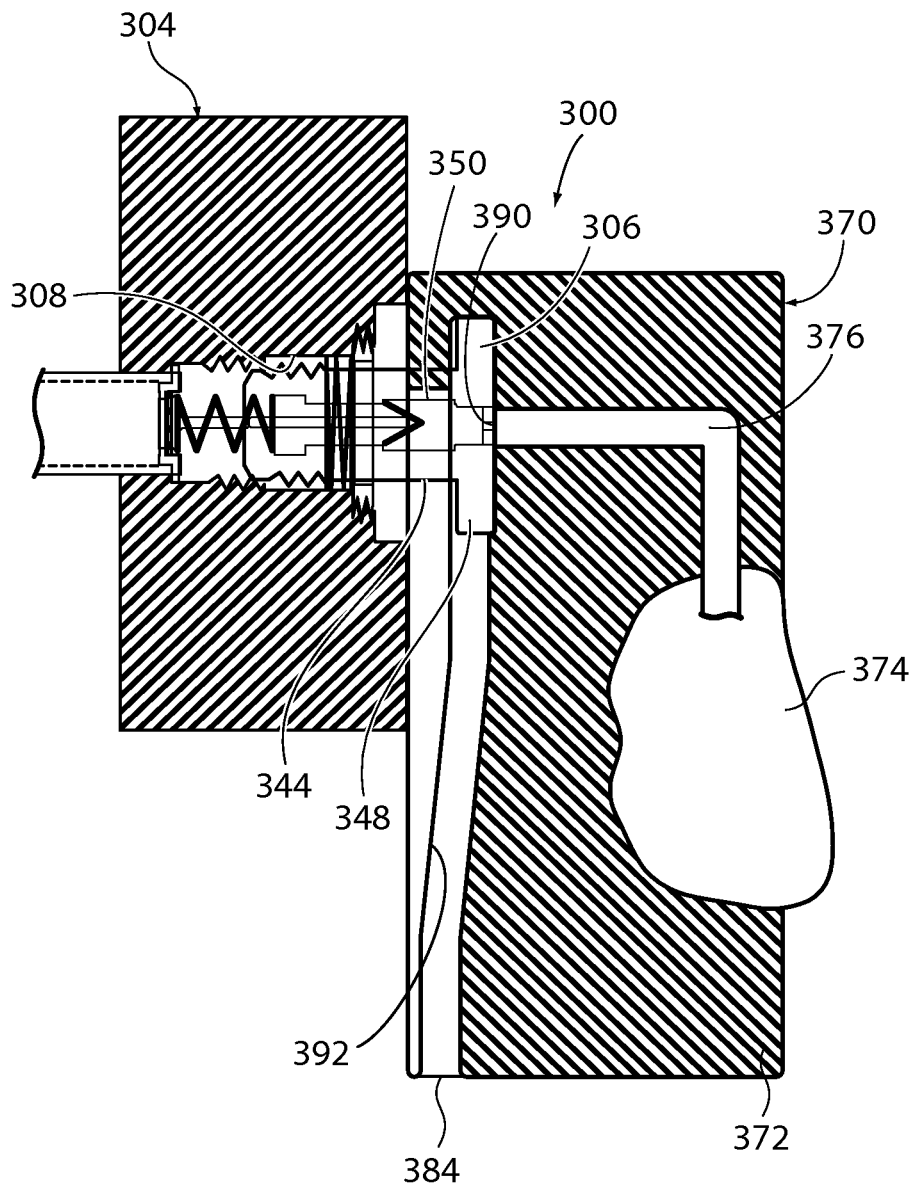
FIG. 18 is a partial cross-sectional view similar to FIG. 17, showing the accessory device of FIGS. 15 and 16 engaged with the host portion of a substance communication coupling system of FIGS. 12-14.
Figure 19:
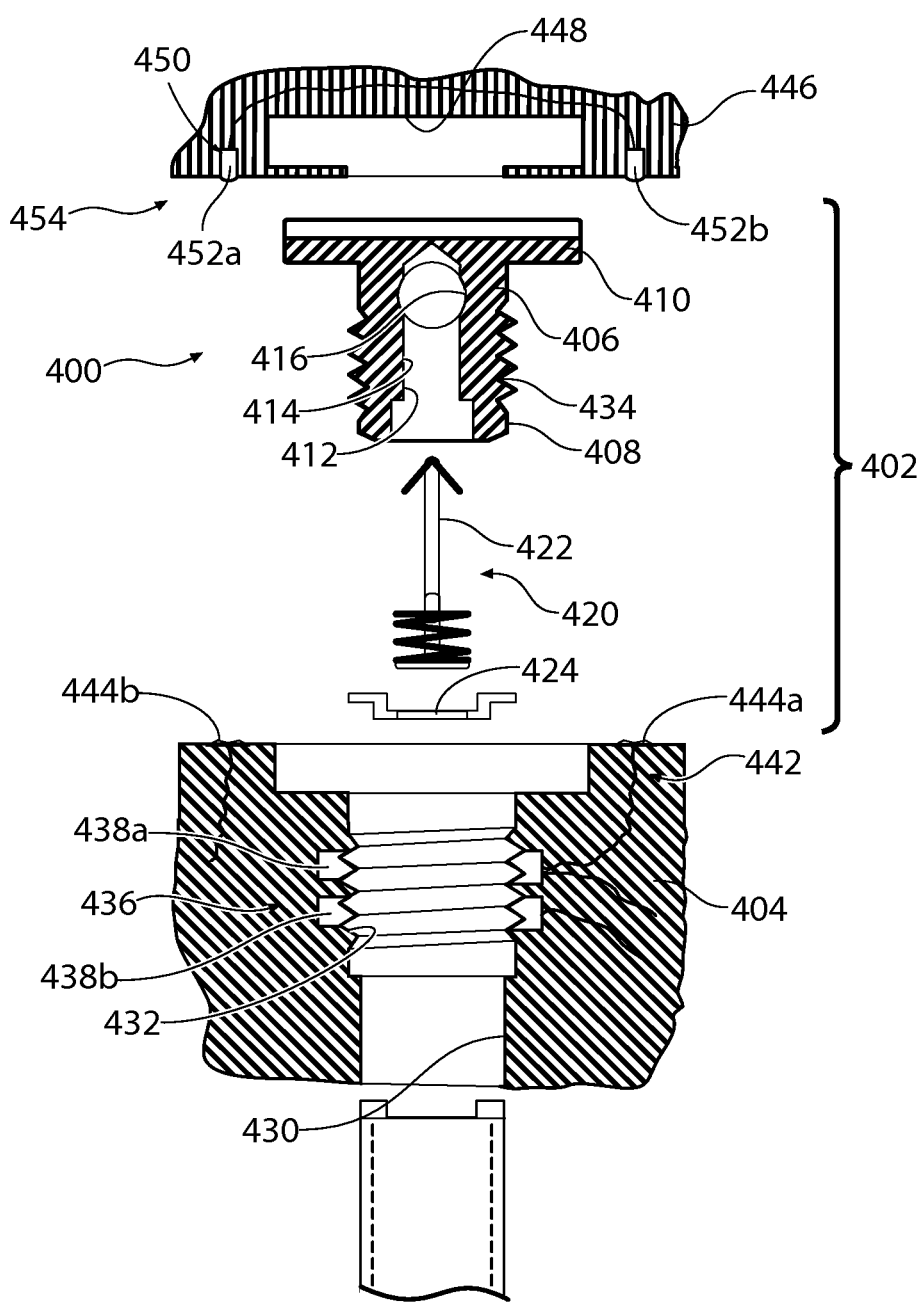
FIG. 19 is an exploded and partially sectional view of a substance communication coupling system according to a seventh embodiment of the invention.
Figure 20:
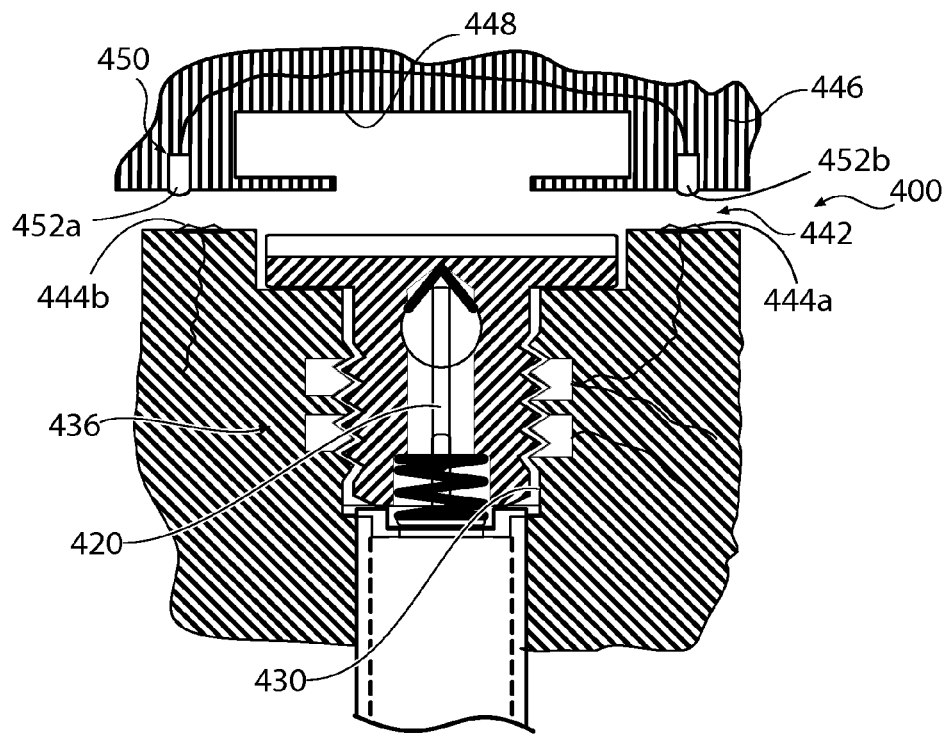
FIG. 20 is a partial sectional view of the substance communication coupling system of FIG. 19, shown in a retracted orientation.
Figure 21:
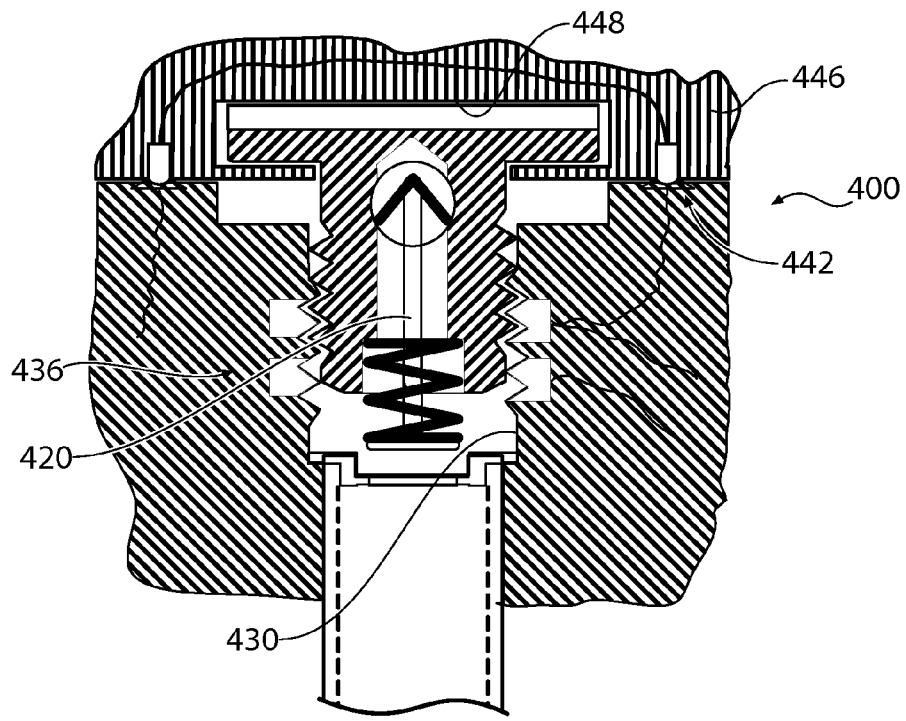
FIG. 21 is a partial sectional view of the substance communication coupling system of FIG. 19, shown in an extended and engaged orientation.

Referring to FIGS. 17 and 18, the substance communication coupling system 300 according to the sixth embodiment of the invention is illustrated, with accessory device 370 positioned for engagement with, and a engaged with, respectively, the host 304. Accessory device 370 may be coupled with host 304 by retracting spigot 306 from threaded engagement with bore 308 as described above with reference to FIG. 14B. Accessory device 370 is positioned adjacent host 304 with channel opening 384 aligned with head 348 of spigot 306. The T-shaped cross section defined by channel 380 and slot 382 are proportioned to accept admission of head 348 into channel 380 and shank 344 into slot 382. For installation of accessory device 370, housing 372 is slid along the host 304 with head 348 of spigot 306 engaged in channel 380. Rails or other alignment features, not shown, may be provided between accessory device 370 and host 304 for facilitating alignment or providing mechanical support or connection therebetween.

As shown in FIG. 18, as housing 372 is slid along the host 304 with head 348 of spigot 306 engaged in channel 380, shank 344 is further retracted from bore 308 due to the intermediate sloping portion 392 such that, when accessory device 370 has been advanced to the point where passageway 350 through spigot 306 is aligned with transverse substance line opening 390 into substance line 376, spigot 306 is sufficiently retracted from bore 308, as described above with reference to FIG. 14C, to permit flow of substance from host 304 to accessory device 370.

Thus, spigot 306 may act as a proximity sensor, responding to the presence of accessory device 370 when accessory device 370 exerts a pulling force on spigot 306. The portion of housing 372 adjacent sloping portion 392 of channel 380 acts as a proximity target activating the proximity sensor to open a substance switch to permit flow of substance when the accessory device 370 is properly connected to host 304. As described elsewhere, an electrical or pneumatic switched valve and proximity sensor and proximity target system may be used as an additional valve system to inhibit dispensing substance when spigot 306 is fully engaged with bore 308.

Referring to FIGS. 19 through 22, a substance communication coupling system 400 according to a seventh embodiment of the invention is illustrated, and employs a substance delivery system using multiple proximity systems to inhibit or permit flow of substance. The substance communication coupling system 400 includes a host substance connector component 402 associated with a host 404 and a device substance connector component 454 associated with an accessory device 446. Host substance connector component 402 may include a threaded spigot 406 similar to threaded spigot 306 described above with reference to FIGS. 12-18, except as described below. Threaded spigot 406 has a shank 408, a head 410, and a passageway 412 for passage of a substance therealong. Passageway 412 includes a first passageway portion 414 extending axially through shank 408, but not through head 410, and interconnected with a second passageway portion 416 extending transversely through shank 408 near head 410.

Host substance communicating connector component 402 further includes a valve system 420 having a plunger 422 engaging a baffle plate 424 in a manner similar to host substance communicating connector component 302 described above.

Host 404 has a bore 430 similar to bore 308 described above with reference to FIGS. 12-18, except as described below. Bore 430 includes threads 432 for engagement with threads 434 on shank 408 of spigot 406. A proximity sensor 436, such as a pair of electrical contact rings 438a and 438b, is provided adjacent threads 432 and a proximity target, not shown, such as an electrically conductive surface, is provided on threads 434. Proximity sensor 436 acts as a switch, providing a connection with the electrically conductive surface to provide a signal indicating the spigot 406 is in a retracted position. When spigot 406 is advanced out of bore 430, the electrically conductive surface on the threads 432 retreats from contact with the electrical contact rings, breaking the circuit and discontinuing the signal. Proximity sensor 436 may be a signal line that is normally open when threaded spigot 406 is fully engaged with threads 432 and closed when spigot 406 is partially engaged with threads 432.

A second proximity sensor 442, such as a pair of electrical contacts 444a and 444b are provided on a surface of host 404 near bore 430. Device substance connector component 454 of accessory device 446 has a channel 448, similar to channel 380 described above, for engagement with spigot 406. A proximity target 450, such as a pair of electrically interconnected electrical contacts 452a and 452b, are provided on accessory device 446 for engagement with proximity sensor 442. When accessory device 446 is coupled to host 404, the proximity target 450 engages proximity sensor 442, thereby completing a circuit to provide a signal indicating that host 404 and device 446 are coupled, the signal selectively permitting the flow of substance from host 404 to accessory device 446 in any of the manners previously described. Proximity sensor 442 is normally closed when head 410 is engaged to hold accessory device 446 in close proximity to host 404.

Substance communication coupling system 400 operates similarly to substance communication coupling system 300 described above in that flow of substance through the system 400 is inhibited unless proximity sensor 442 detects an appropriate accessory device 446 by detecting a proximity target and further that proximity sensor 436 detects that spigot 406 has been is biased sufficiently out of bore 430 to engagement position to engage the accessory device 446.

It will be appreciated that, alternatively, proximity sensor 436 can be a signal line that is normally closed when threaded spigot 406 is fully engaged with threads 432 and opened when spigot 406 is partially engaged with threads 432 and wired in series with the proximity sensor 442.

Figure 22:
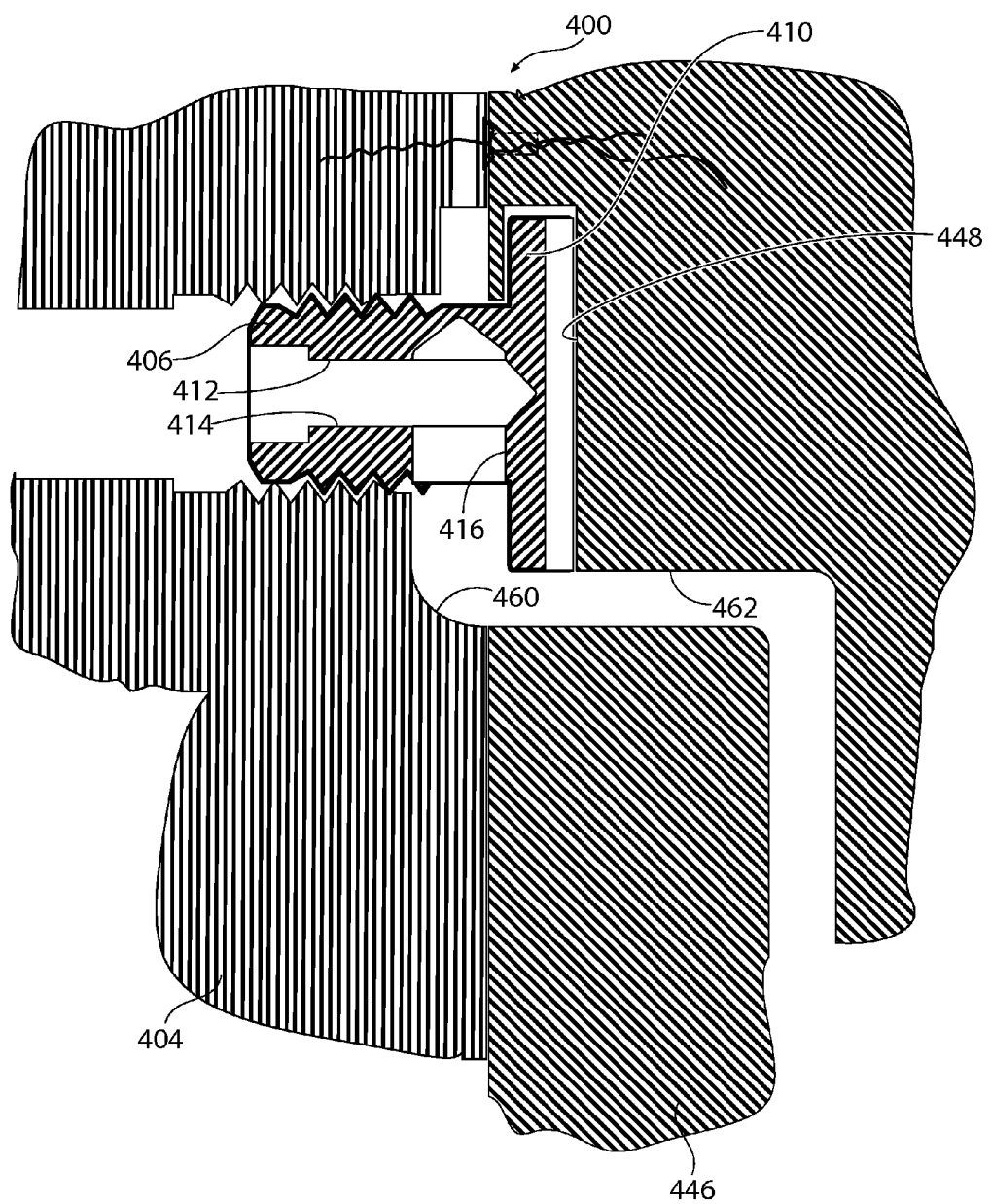
FIG. 22 is a partial cross-sectional view of the mechanically energized substance communication coupling system of FIG. 19 illustrating a device portion engaged with a host portion.

As shown schematically in FIG. 22, host 404 may be provided with a recess 460 aligned with second passageway portion 416 when spigot 406 is fully extended. Accessory device 446 may be provided with a substance line 462 aligned with recess 460 when accessory device 446 is connected to host 404. For the dispensing of some substances, such as heated or cooled air, or solids such as capsules or crushed ice, no seal may be required between host 404 and accessory device 446 around the interface between recess 460 and substance line 462. For other substances, a suitable sealing system, not shown, may be provided.

Figure 23:
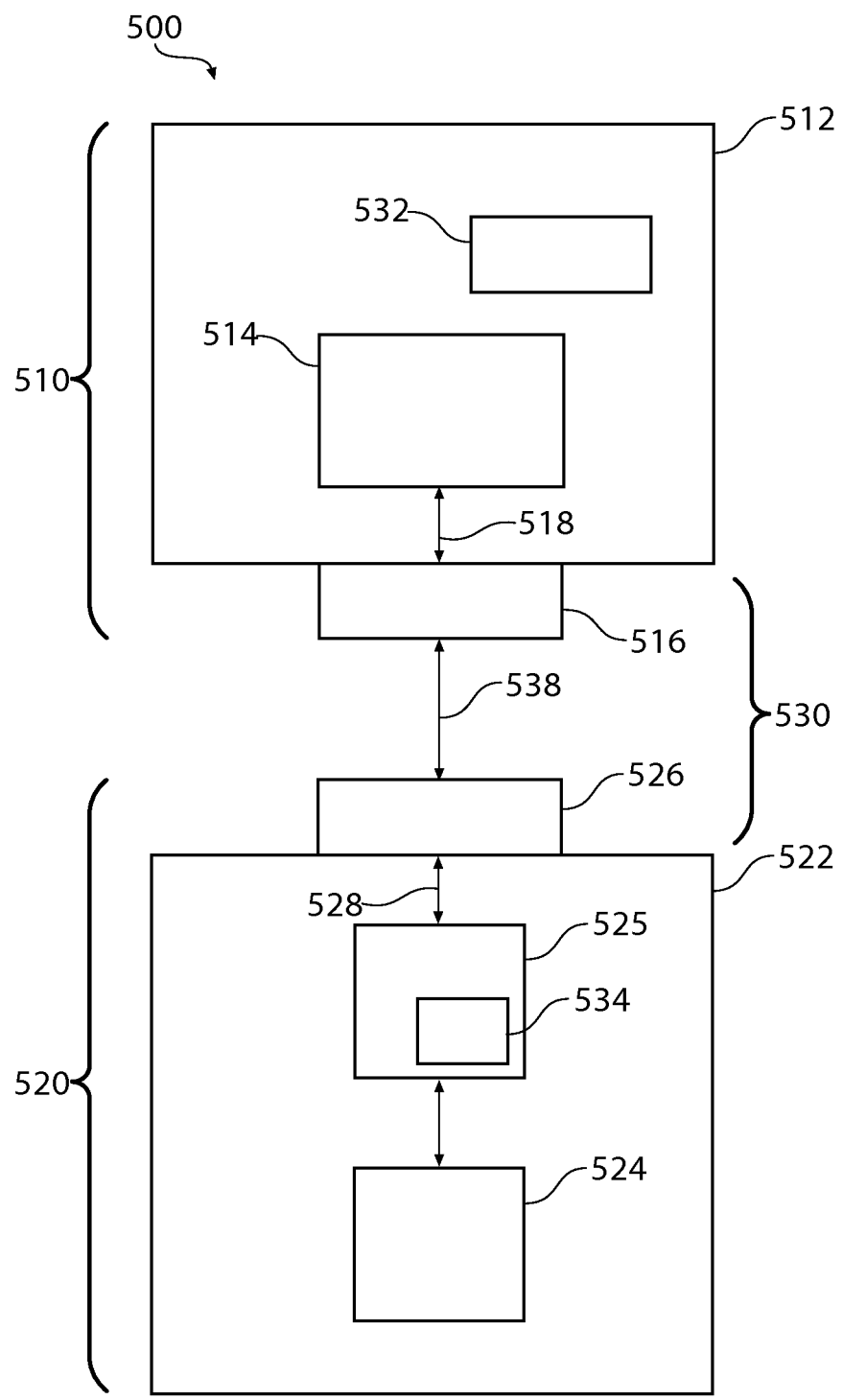
FIG. 23 is a schematic illustration showing a substance supply and consumption system.

With reference to FIG. 23, a more general example of a substance supply and consumption system 500 is schematically illustrated. A first subsystem 510 is connectable to a second subsystem 520 for selectively transferring a substance between subsystems 510 and 520. As illustrated, first subsystem 510 may include an accessory device 512, such as a portable electronic device, including a substance consumer 514 connected to a first service connection component, such as a plug 516, by means of a substance line 518. Second subsystem 520 may include a host 522, such as a refrigerator, including a substance provider 524 connected to a second service connection component, such as a receptacle 526, through a substance switch 525 by substance line 528.

A connector system 530 includes plug 516 and receptacle 526, which are selectively interengageable. A proximity target 532 and a proximity switch 534, which includes a proximity sensor for detecting the presence of proximity target 532, are respectively associated with first subsystem 510 and second subsystem 520, respectively. Proximity switch 534 is operable to selectively activate substance switch 525 when plug 516 and receptacle 526 are engaged, as determined by the proximity sensor, to permit the flow of the substance from substance provider 524 along pathway 538 to the receptacle 526, then along a mechanical power service communication service pathway 538 between receptacle 526 and plug 516, and then along substance line 518 to substance consumer 514.

It will be appreciated that while host 522 is illustrated as including a substance provider and accessory device 512 is illustrated as including a substance consumer, accessory device 512 may alternatively or additionally include a substance provider and host 522 may alternatively or additionally include a substance consumer. It will further be appreciated that while plug 516 is illustrated as being associated with substance consumer 514 and receptacle 526 is illustrated as being associated with substance provider 524, it is contemplated that plug 516 and receptacle 526 may be male or female connector components so long as the components are capable of interengaging to permit the transfer of substance therebetween.

With regard to the processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In summary, it should be understood that the invention is capable of modification and variation and is limited only by the following claims.

All defined terms used in the claims are intended to be given their broadest reasonable constructions consistent with the definitions provided herein. All undefined terms used in the claims are intended to be given their broadest reasonable constructions consistent with their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system for receiving a substance consumer comprising:
   a substance communication coupling system comprising:
   a first substance connector component capable of being operably associated with the substance consumer and including a contact proximity target;

a second substance connector component operably engageable with the first substance connector component, the second substance connector component being capable of being operably associated with a substance source;

a substance switch operably associated with the second substance connector component, the substance switch selectively permitting the flow of the substance from the substance source to the first substance connector component; and a contact proximity sensor operably associated with the substance switch, the contact proximity sensor engageable with the contact proximity target when the first substance connector component is engaged with the second substance connector component;

wherein the substance switch is operable to permit flow of the substance to the first substance connector component in response to the contact proximity sensor engaging the contact proximity target;

wherein the contact proximity sensor comprises a contact proximity switch moveable between a first position when the first substance connector component is disengaged from the second substance connector component, and a second position when the first substance connector component is engaged with the second substance connector component, the substance switch responding to movement of the contact proximity switch; and wherein the contact proximity target pulls the contact proximity sensor into the second position.

2. The system according to claim 1, wherein the substance switch and the contact proximity sensor are integrated into a common unit.

3. The system according to claim 1, wherein the contact proximity sensor transmits a signal to the substance switch indicating that the first substance connector component is engaged with the second substance connector component.

4. The system according to claim 3, wherein the substance switch permits flow of the substance through the first substance connector component in response to the signal received from the contact proximity sensor.

5. The system according to claim 3, wherein the signal includes at least one of an electrical signal, a pneumatic signal, an optical signal, a magnetic flux signal, a radio frequency signal, an infrared signal, a hydraulic signal, and physical displacement.

6. The system according to claim 1 and further comprising a biasing member for biasing the contact proximity switch to the first position when the first substance connector component is disengaged from the second substance connector component.

7. The system according to claim 6 wherein the contact proximity switch further comprises a link connected to the substance switch, wherein movement of the contact proximity switch is transmitted through the link to the substance switch.

8. The system according to claim 1, wherein the second substance connector component is provided on a host, and the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, a trash compactor, an air purifier, an iron, a vacuum cleaner, a robot, and a structural feature of a building.

9. The system according to claim 1 and further comprising an accessory device comprising the substance consumer.

10. The system according to claim 1 and further comprising an accessory device including the substance consumer.

11. A substance communication coupling system for connecting a portable device to a host, the substance communication coupling system comprising:

a substance connector component capable of communicating a substance;

a substance switch operably connected to the substance connector component for selectively permitting the substance to be transmitted to the substance connector component; and a contact proximity sensor operably connected to the substance switch and engageable with a contact proximity target;

wherein the substance switch is configured to allow the substance to be transmitted to the substance connector component when the contact proximity sensor engages the contact proximity target;

wherein the contact proximity sensor comprises a contact proximity switch moveable between a first position when the contact proximity sensor is disengaged from the contact proximity target, and a second position when the contact proximity sensor is engaged with the contact proximity target, the substance switch responding to movement of the contact proximity switch; and wherein the contact proximity target pulls the contact proximity sensor into the second position.

12. The system according to claim 11, wherein the substance switch and the contact proximity sensor are integrated into a common unit.

13. The system according to claim 11 and further comprising a substance source operably connected to the substance switch for supplying the substance.

14. The system according to claim 11, wherein the contact proximity sensor transmits a signal to the substance switch indicating that the contact proximity sensor is engaging the contact proximity target.

15. The system according to claim 14, wherein the substance switch permits flow of the substance to the substance connector component in response to the signal received from the contact proximity sensor.

16. The system according to claim 14, wherein the signal includes at least one of an electrical signal, a pneumatic signal, an optical signal, a magnetic flux signal, a radio frequency signal, an infrared signal, a hydraulic signal, and physical displacement.

17. The system according to claim 11 further comprising a biasing member for biasing the contact proximity switch to the first position when the contact proximity sensor is disengaged from the contact proximity target.

18. The system according to claim 17 wherein the contact proximity switch further comprises a link connected to the substance switch, wherein movement of the contact proximity switch is transmitted through the link to the substance switch.

19. The system according to claim 11, wherein the host comprises at least one of a refrigerator, a freezer, a conventional oven, a microwave oven, a dishwashing machine, a stove, a range, an air conditioner, a dehumidifier, a clothes washing machine, a clothes dryer, a clothes refreshing machine, a non-aqueous washing apparatus, a water softener, a water heater, a furnace, pool water treatment equipment, an HVAC system, a thermostat, a blender, a mixer, a toaster, a coffee maker, a trash compactor, an air purifier, an iron, a vacuum cleaner, a robot, and a structural feature of a building.

20. A system for use in association with a host having a substance provider, a first substance connector component, and a substance switch selectively providing a substance to the first substance connector component and having a contact proximity sensor, and in association with a substance consumer, the system comprising:
   a second substance connector component engageable with the first substance connector component;
   a substance line interconnecting the substance consumer and the second substance connector component; and
   a contact proximity target capable of pulling the contact proximity sensor to activate the substance switch to provide the substance to the first substance connector component when the second substance connector component is engaged with the first substance connector component.

21. The system according to claim 20, wherein the system further comprises the substance consumer.

22. The system according to claim 21 and further comprising a housing, wherein the substance consumer, the substance line, and the contact proximity target are each at least partially disposed within the housing.

23. The system according to claim 21 and further comprising an adapter, the substance consumer further comprising an accessory device capable of being removably coupled to the adapter.

24. The system according to claim 21, wherein the substance consumer is at least one of an accessory device, a portable appliance, an additional smart coupling device, a resource controller, a consumable holder, a dispenser, a filter, a water filter, an air filter, a detergent dispenser, a drink dispenser, a detergent cartridge, a bottle, and a jug.

25. The system according to claim 21, wherein the substance consumer is portable.

26. A substance communication device for substance communication with an appliance having a housing, a cavity in the housing, the cavity having a first substance connector component, and a contact proximity sensor associated with the first substance connector component, the substance communicating device comprising:
   a second substance connector component capable of connecting with the first substance connector component for the communication of substance therebetween; and
   a contact proximity target associated with the second substance connector component, the contact proximity target being capable of pulling contact proximity sensor to activate the communication of substance between the first and second substance connector components when the first and second substance connector components are coupled.

27. The substance communication device according to claim 26, wherein the substance communication device comprises a consumable holder.

28. The substance communication device according to claim 26, wherein the substance communication device comprises a substance consumer.

29. The substance communication device according to claim 26 wherein the substance communication device comprises a substance provider.

30. The substance communication device according to claim 29 wherein the substance provider selectively provides a substance useful in a cycle of operation performed by the appliance.

31. The substance communication device according to claim 30 wherein the appliance performs the cycle of operation upon the substance provided by the substance provider.

* * * * *